United States Patent

Katahira et al.

[11] Patent Number: 6,154,950
[45] Date of Patent: Dec. 5, 2000

[54] ROTOR PRODUCTION METHOD INCLUDING ASSEMBLING A SLOT INSULATOR AND COIL TRUNK INTO A SET PRIOR TO INSERTION INTO AN ARMATURE CORE

[75] Inventors: Koji Katahira, Chiryu; Yasuhiro Ono; Tatsuo Gotoh, both of Anjo; Norimasa Okada, Toyota; Jiro Ebihara, Nukata-gun; Masayuki Takiguchi, Nagoya, all of Japan

[73] Assignee: Denso Corporation, Kariya, Japan

[21] Appl. No.: 09/035,917

[22] Filed: Mar. 6, 1998

[30] Foreign Application Priority Data

| Mar. 6, 1997 | [JP] | Japan | 9-051291 |
| Mar. 26, 1997 | [JP] | Japan | 9-072925 |
| May 21, 1997 | [JP] | Japan | 9-130914 |
| Dec. 11, 1997 | [JP] | Japan | 9-340981 |
| Dec. 17, 1997 | [JP] | Japan | 9-347384 |

[51] Int. Cl.$^7$ ................................................. H02K 15/02
[52] U.S. Cl. ............................... 29/598; 29/597; 29/606; 310/201
[58] Field of Search ............................ 29/598, 596, 597, 29/606; 310/201, 237, 248, 262, 45, 32; 228/200

[56] References Cited

U.S. PATENT DOCUMENTS

| 3,911,563 | 10/1975 | Anderson | 29/597 |
| 3,991,152 | 11/1976 | Santi et al. | 264/161 |
| 4,833,769 | 5/1989 | Tomite et al. | 29/597 |
| 4,956,910 | 9/1990 | Banner et al. | 29/593 |
| 5,508,577 | 4/1996 | Shiga et al. | 310/201 |
| 5,650,683 | 7/1997 | Shiga et al. | 310/201 |
| 5,739,617 | 4/1998 | Katoh et al. | 310/214 |
| 5,745,977 | 5/1998 | Ichikawa | 29/598 |
| 5,778,512 | 7/1998 | Ichikawa | 29/598 |
| 5,864,193 | 1/1999 | Katoh | 310/214 |

*Primary Examiner*—Lee Young
*Assistant Examiner*—Minh Trinh
*Attorney, Agent, or Firm*—Pillsbury Madison & Sutro LLP

[57] ABSTRACT

In a production method of a rotor, a lower layer slot insulator is held at a slot insulator holding portion of a combining jig. A lower layer coil bar is inserted into a coil inserting path of the combining jig and is combined integrally with the lower layer slot insulator by being pushed together. Thereafter, the combined set is set in a coil integrating path of a coil holding member. The coil holding member is attached to a coil inserting device along with an armature core. The lower layer slot insulator and a lower coil trunk are integrally inserted into a slot of the armature core by pushing the lower layer coil bar in the coil integrating path. The lower layer coil trunk and an upper layer coil trunk may be formed integrally with respective coil arms as a single coil bar.

9 Claims, 22 Drawing Sheets

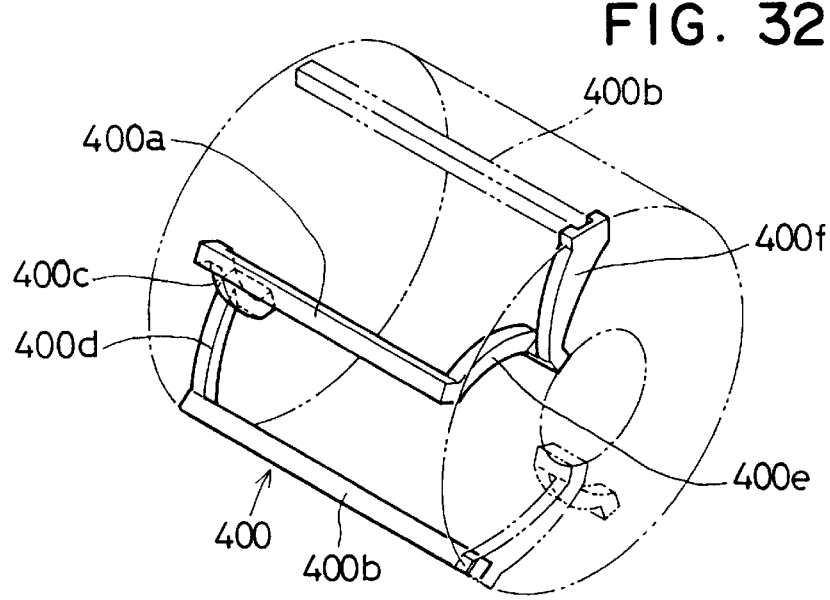
FIG. 32
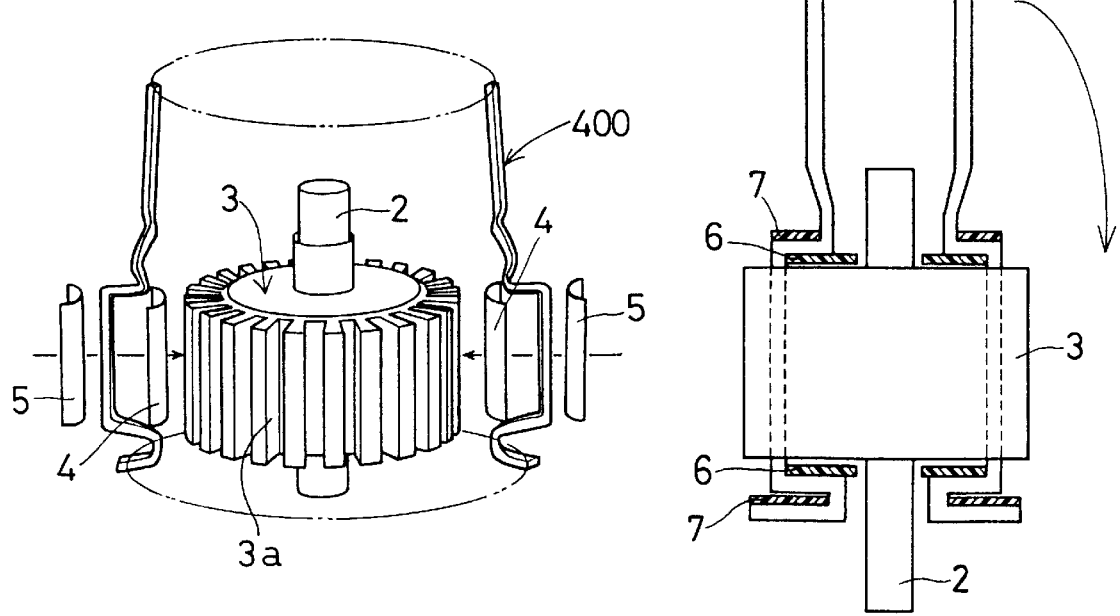
FIG. 33
FIG. 34

ROTOR PRODUCTION METHOD INCLUDING ASSEMBLING A SLOT INSULATOR AND COIL TRUNK INTO A SET PRIOR TO INSERTION INTO AN ARMATURE CORE

CROSS REFERENCE TO RELATED APPLICATION

This application relates to and incorporates herein by reference Japanese Patent Application Nos. 9-51291, 9-72925, 9-130914, 9-340981 and 9-347384, filed on Mar. 6, 1997, Mar. 26, 1997, May 21, 1997, Dec. 11, 1997 and Dec. 17, 1997, respectively.

BACKGROUND OF THE INVENTION

1. Field of the Invention

The present invention relates to a production method and a production apparatus for a rotor which is produced by combining a slot insulator and a coil bar to a rotor core.

2. Description of Related Art

Japanese Patent Application No. 7-326983 (U.S. patent application Ser. No. 08/574,033) discloses a method of integrating or assembling coil bars (lower layer coil bars and upper layer coil bars) each in a channel-like shape having a linear coil trunk and a pair of coil arms and slot insulators (lower layer slot insulators and upper layer slot insulators) for insulating the coil trunks inserted into slots of a rotor (armature) core from the armature core, to the armature core.

However, according to the above integrating method, there poses the following problem in order to insert the coil trunks of the coil bars into the slots after inserting the slot insulators into the slots of the armature core.

That is, the slot insulators are not positioned in the axial direction in respect of the slots of the armature core and therefore, the slot insulators may be shifted in the axial direction in the slots. In this case, for example, in respect of the lower layer slot insulator, the length in the axial direction is substantially equal to the length of the slot (length of armature core in the axial direction) plus a thickness of a pair of disk-like inner side insulators and therefore, when the lower layer slot insulator is shifted in the axial direction at inside of the slot, one end of the lower layer slot insulator is projected from either of end faces of the pair of disk-like inner side insulators arranged at both end faces of the armature core. When the lower layer coil bar is made to be inserted into the slot under this state, as shown in FIG. 46, a coil trunk 8b of a lower layer coil bar 8 may interfere with the projected one end of the lower layer slot insulator 4 and a coil arm 8a may not be inserted into a slot 3a with certainty.

Particularly, when the length of the lower layer slot insulator in the axial direction is set to be slightly larger than the length of the lower layer coil trunk, the influence by the shift of the lower layer slot insulator in the axial direction becomes significant. As a result, when, for example, the lower layer slot insulator is produced by a soft material in a thin film shape, it is conceivable that the lower layer slot insulator may be deformed or destructed easily by the interference with the coil arm.

Further, when the slot insulator is integrated to shift in the axial direction in respect of the slot, although one end of the slot insulator in the axial direction is projected from the end face of the armature core, the other end of the slot insulator is recessed from the end face of the armature core and therefore, the wall face of the slot is exposed and the insulation in respect of the coil trunk cannot be ensured.

Further, although a method of positioning the slot insulator in the axial direction in respect of the slot by arranging a positioning member on the side of the end face of the armature core and bringing one end of the slot insulator in contact with the positioning member, is possible, when the slot insulator is produced by a soft material in a thin film shape, the rigidity of the slot insulator is deficient and therefore, the accurate positioning may not be carried out since the side of the one end of the slot insulator which is brought into contact with the positioning member is deformed. When the coil trunk is inserted into the slot under this state, the coil arm interferes with the deformed portion of the slot insulator and the coil trunk cannot be integrated into the slot with certainty. Further, when the slot insulator is shifted in the axial direction in accordance with the deformation of the one end side, the other end side of the slot insulator is recessed into the slot and the wall face of the slot is exposed and therefore, the coil trunk may not be insulated from the armature core with certainty.

SUMMARY OF THE INVENTION

It is an object of the present invention to provide a production method and a production apparatus for a rotor capable of integrating a slot insulator and a coil bar with certainty without causing deformation or destruction of the slot insulator in integrating the coil bar to a rotor core.

It is a further object of the present invention to provide a production method for a rotor of a rotating electric machine capable of reducing bonding portions of coil bars and facilitating integration of the coil bars to a rotor core.

According to one aspect of the present invention, slot insulators and coil trunks are previously combined before insertion into an armature core and the combined sets of slot insulators and coil bars are integrally inserted into slots from outer peripheral side in the radial direction of the armature core to thereby integrate to the armature core. According to the method, the slot insulators are inserted into the slots integrally with the coil bars and therefore, the slot insulators are prevented from being positionally shifted in the axial direction in respect of the slots and the slot insulators and the coil bars can be integrated to the armature core with certainty.

According to another aspect of the present invention, the slot insulator is provided with a section in a channel-like shape comprising a bottom face portion for receiving an inner peripheral face of the coil trunk and a pair of side face portions erected from both sides of the bottom face portion for receiving side faces of the coil trunk and is integrated to the slot in a state where front end portions of the pair of side face portions are opened to an outer side. In this case, when the slot insulator is integrated into the slot and thereafter, the coil trunk is inserted into the slot, the coil trunk can be prevented from interfering with opening edge portions (front edge portions of the side face portions). Thereby, the slot insulator can be prevented from being bitten in when the coil trunk is inserted and accordingly, a failure in inserting the coil trunk into the slot can be prevented.

According to a further aspect of the present invention, in respect of a coil bar integrated to an armature core, a lower layer coil trunk, an upper layer coil trunk and all coil arms are integrally formed. In this case, respective ends of the lower layer coil trunk and the upper layer coil trunk need not to connect to the corresponding arms and therefore, bonding portions can be reduced. Further, the coil bar is integrated to the armature core by inserting the lower layer coil trunk to a slot, thereafter, bending one coil arm to the side of the armature core, and inserting the upper layer coil trunk to another slot provided to space apart with a predetermined interval from the slot to which the lower layer coil trunk has been inserted in the peripheral direction of the armature core. In this way, after inserting the lower layer coil trunk to the slot, the one coil arm can be bent and the upper layer coil trunk can be inserted into the predetermined slot and therefore, compared with the case where a finished coil which has previously been formed into a shape after inserting the coil into a slot is integrated to an armature core, the operation of integrating the coil bar to the armature core is facilitated and the possibility of impairing the coil bar in inserting the upper layer coil trunk to the slot is also reduced.

BRIEF DESCRIPTION OF THE DRAWINGS

Other objects, features and advantages of the present invention will become more apparent by the following detailed description when read with reference to the accompanying drawings. In the drawings:

FIG. 32 is a perspective view of the coil bar integrated to the armature core;

FIG. 33 is a perspective view showing the step of integrating the coil bar to the armature core;

FIG. 34 is a side view showing the step of integrating the coil bar to the armature core;

DETAILED DESCRIPTION OF THE PREFERRED EMBODIMENTS

Figure 1:
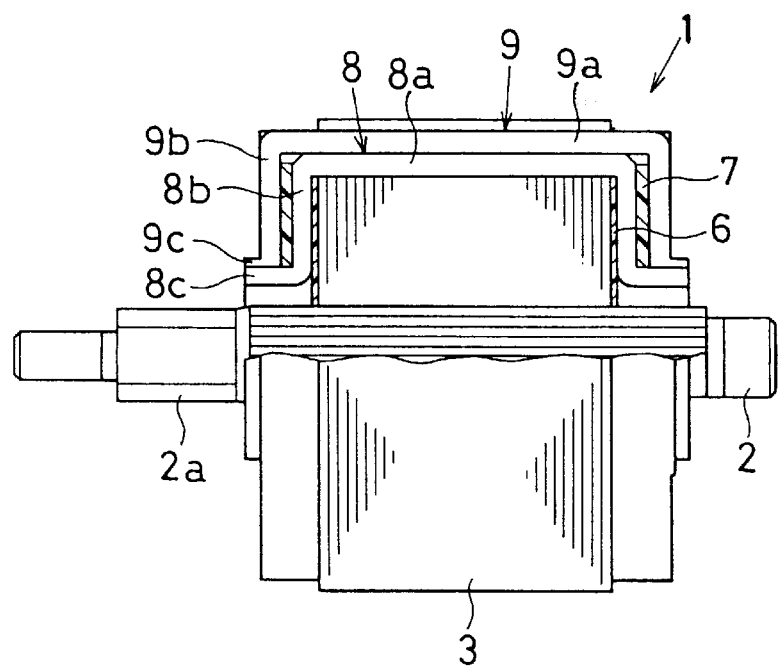
FIG. 1 is a half-cut sectional view of an armature.

The present invention will be described in detail hereunder with reference to various embodiments in which the same or like parts are denoted by the same or similar reference numerals.

Figure 2:
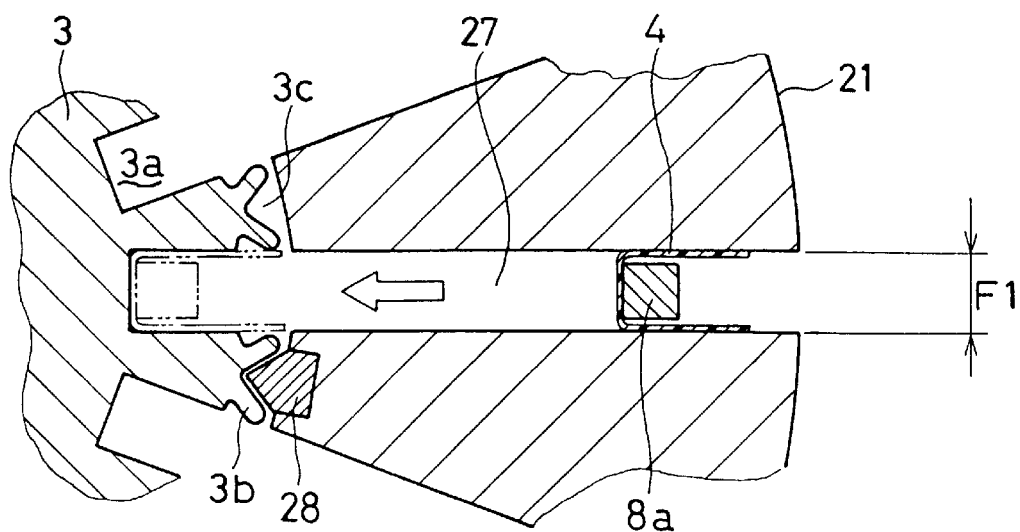
FIG. 2 is a sectional view showing a step of combining and inserting a lower layer slot insulator and a lower layer coil bar.
Figure 3:
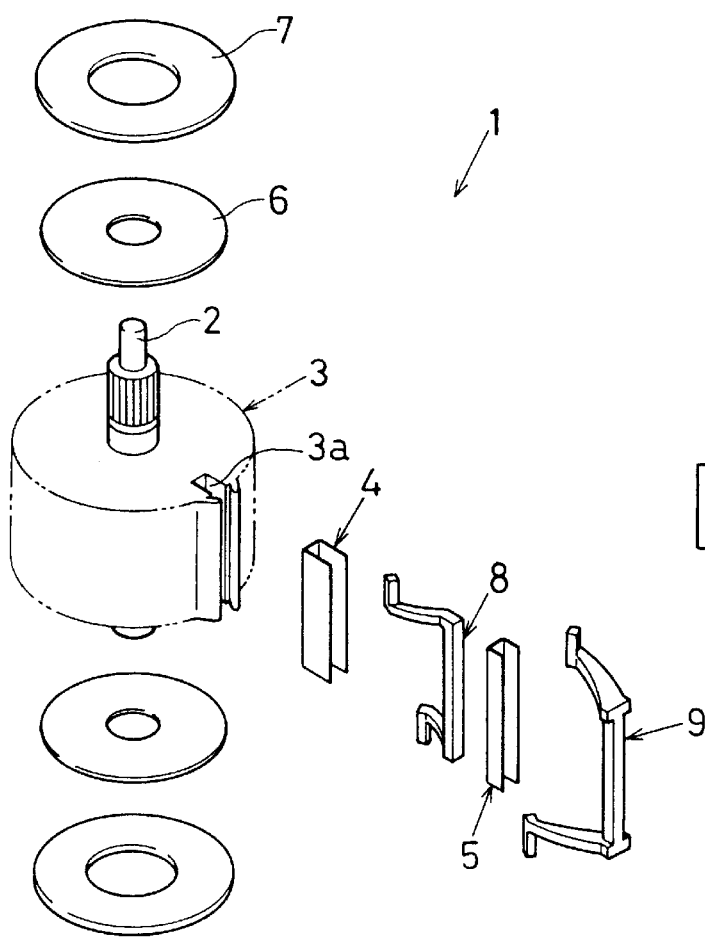
FIG. 3 is a disassembled perspective view of the armature.

As shown in FIGS. 1 to 3, an armature 1 of a starter is constructed by a rotating shaft 2, an armature core 3, armature coils, slot insulators (lower layer slot insulator 4 and upper layer slot insulator 5), ring-like insulators (inner side ring-like insulator 6 and outer side ring-like insulator 7) and the like. The rotating shaft 2 is supported rotatably via bearings, not illustrated.

The armature core 3 is produced by laminating a plurality of sheets of thin steel plates formed in a disk-like shape and press-fitting the thin steel plates to the outer periphery of the rotating shaft 2 for integral rotation with the rotating shaft 2. A predetermined number (for example, 25 pieces) of slots 3a are respectively recessed along the axial direction and provided at an equal pitch in the peripheral direction of the armature core 3. Further, pairs of projections 3b for pressing are respectively provided in the armature core 3 on the outer peripheral faces among the respective slots 3a which are contiguous in the peripheral direction.

The armature coil is constructed by a lower layer coil bar 8 and an upper layer coil bar 9 formed by pure copper or pure aluminum having low electric resistance and the number of respective bars is equal to the number of the slots 3a.

Figure 4A:
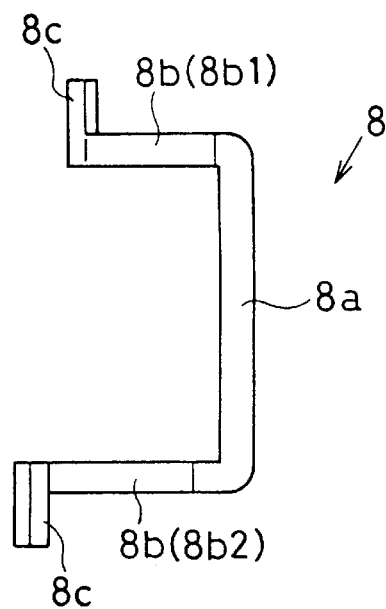
FIGS. 4(a), 4(b) and 4(c) are three side views of a lower layer coil bar.
Figure 4B:
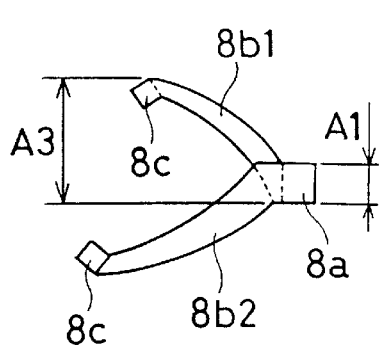
Figure 4C:
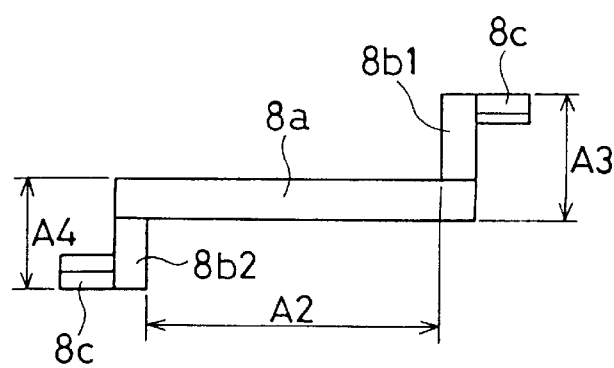

As shown in FIGS. 4(a), 4(b) and 4(c), the lower coil bar 8 is constructed by a coil trunk 8a extending linearly or straightly (axially in FIG. 1), a pair of coil arms 8b extending from both ends of the coil trunk 8a substantially orthogonally (radially in FIG. 1) to the coil trunk 8a and pairs of projected portions 8c extending from front ends of the respective coil arms 8b substantially orthogonally thereto to sides opposed to the coil trunk 8a. As shown in FIG. 4(b), a pair of coil arms 8b (8b1, 8b2) are provided to be inclined by a predetermined angle to opposed sides in the peripheral direction centering on the coil trunk 8a.

The lower coil bar 8 is integrated to the armature core 3 by inserting the coil trunk 8a into the slot 3a along with the lower layer slot insulator 4.

An upper layer coil bar 9 is constructed by a linearly extending coil trunk 9a, a pair of coil arms 9b extending from both ends of the coil trunk 9a substantially orthogonally to the coil trunk 9a and a pair of projected portions 9c extending from front ends of the respective coil arms 9b substantially orthogonally thereto to sides opposed to the coil trunk 9a. The pair of coil arms 9b are installed to be inclined by a predetermined angle opposedly to each other in the peripheral direction centering on the coil trunk 9a.

The upper layer coil bars 9 are integrated to the armature core 3 after integrating a predetermined number of the lower layer coil bars 8 to the armature core 3, by inserting the coil trunks 9a to the outer sides of the lower layer coil trunks 8a in the slots 3a along with the upper layer slot insulators 5.

The slot insulators are constructed by the lower layer slot insulators 4 and the upper layer slot insulators 5 which are formed by folding a thin film member having insulating performance and flexible performance (for example, resin material, insulating paper or the like) in predetermined shapes and numbers of the respective insulators are equal to numbers of the slots 3a.

Figure 5:
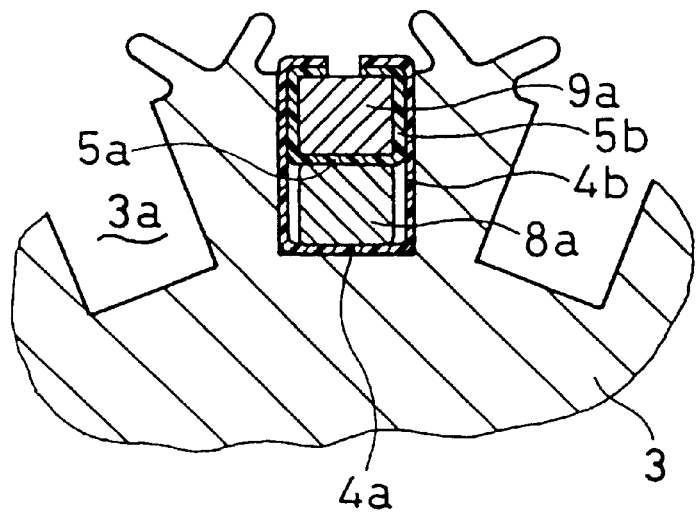
FIG. 5 is a sectional view showing a state where coil bars are inserted into a slot.
Figure 6:
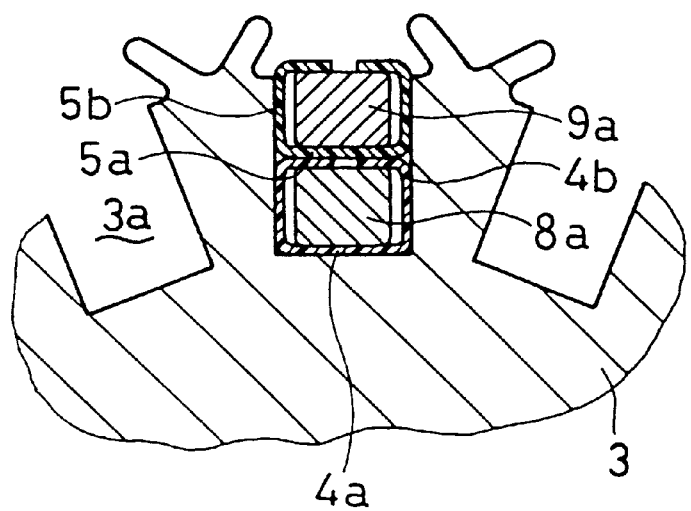
FIG. 6 is a sectional view showing a state where coil bars are inserted into a slot.

As shown in FIG. 5 or FIG. 6, the lower layer slot insulator 4 insulates the lower layer coil trunk 8a inserted into the slot 3a from the armature core 3 and is provided with a section in a channel-like shape comprising a bottom face portion 4a for receiving the coil trunk 8a and a pair of side face portions 4b erected from both sides of the bottom face portion 4a for receiving side faces of the coil trunk 8a.

As shown in FIG. 5 or FIG. 6, the upper slot insulator 5 insulates the upper layer coil trunk 9a inserted into the slot 3a from the lower layer coil trunk 8a and the armature core 3 and is provided with a section in a channel-like shape comprising a bottom face portion 5a for receiving the coil trunk 9a and a pair of side face portions 5b erected from both sides of the bottom face portion 5a for receiving side faces of the coil trunk 9a.

As shown in FIG. 1, the ring-like insulators are constructed by inner side ring-like insulators 6 interposed between end faces of the armature core 3 in the axial direction and the lower layer coil arms 8b for insulating from each other and outer side ring-like insulators 7 interposed between the lower layer coil arms 8b and the upper layer coil arms 9b for insulating from each other.

The armature 1 is generally produced as follows. First, the inner side ring-like insulators 6 are integrated to the both end faces in the axial direction of the armature core 3 that is press-fitted to the rotating shaft 2 in a contact state. Next, predetermined numbers of the lower layer slot insulators 4 and the lower layer coil bars 8 are integrated to the armature core 3 in a manner described below. Successively, the outer side ring-like insulators 7 are respectively fitted to the outer diameter of the lower layer projected portions 8c on the both sides. Next, predetermined numbers of the upper layer slot insulators 5 and the upper layer coil bars 9 are integrated to the armature core 3 (the integrating step is substantially the same as the step of integrating the lower layer slot insulators 4 and the lower layer coil bars 8 to the armature core 3. Finally, the lower layer projected portions 8c and the upper layer projected portions 9c overlapping in the radial direction above the outer periphery of the rotating shaft 2, are mechanically and electrically bonded by welding or the like.

EMBODIMENT 1

The lower layer slot insulator 4 and the lower layer coil bars 8 are integrated or assembled to the armature core 3 by using a coil integrating device.

Figure 7A:
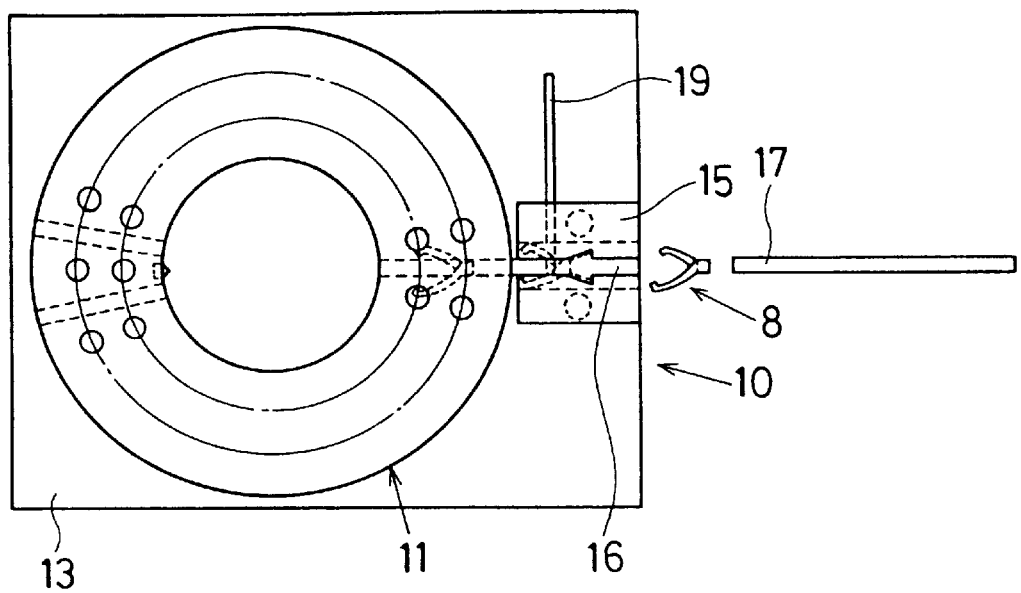
FIG. 7(a) is a plan view of a combining jig and a coil holding member and FIG. 7(b) is a side view thereof (First embodiment)
Figure 7B:
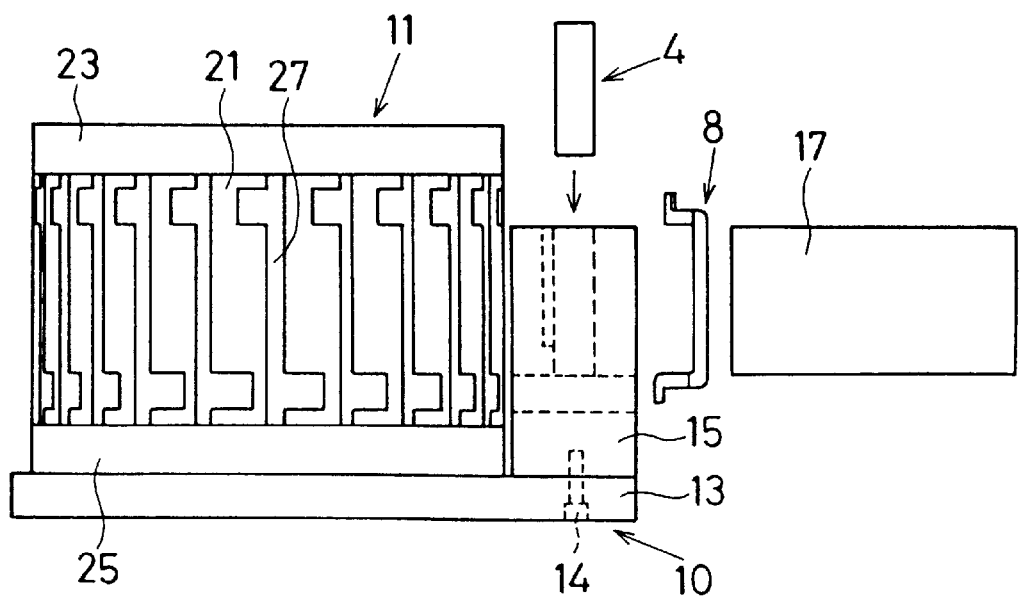
Figure 8:
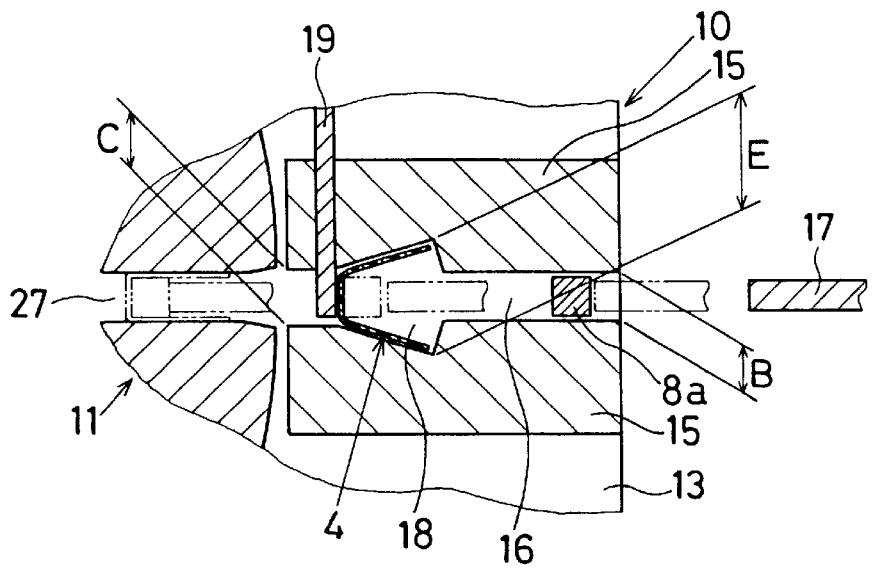
FIG. 8 is a horizontal sectional view of essential portions of the combining jig.
Figure 9:
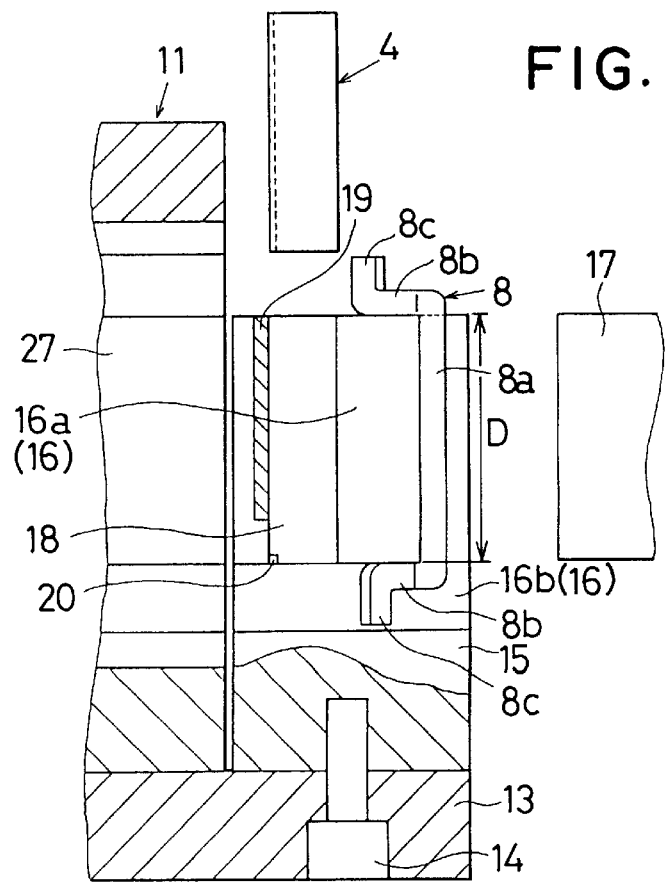
FIG. 9 is a vertical sectional view of essential portions of the combining jig.
Figure 10:
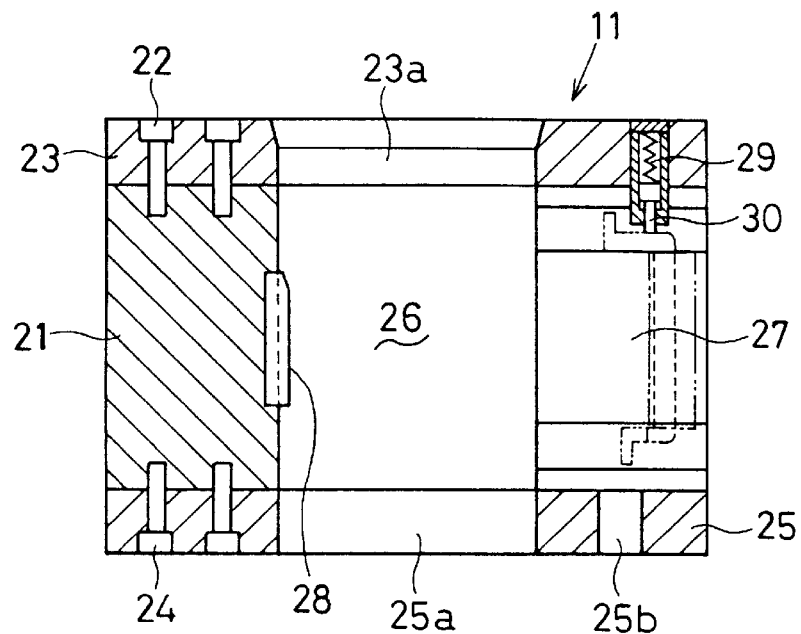
FIG. 10 is a sectional view of the coil holding member.

The coil integrating device is constructed by a combining jig 10 (FIGS. 7(a), 7(b), 8 and 9) for combining the lower layer slot insulator 4 and the lower layer coil bar 8, a coil holding member 11 (FIGS. 7(a) and 7(b) and FIG. 10) for integrally holding the lower layer slot insulator 4 and the lower layer coil bar 8 integrated by the combining jig 10, and a coil inserting device 12 (FIG. 12) for inserting the lower layer slot insulator 4 and the coil trunk 8a of the lower layer coil bar 8 integrally into the slot 3a of the armature core 3 by pushing the lower layer coil bar 8 held by the coil holding member 11 to the side of the armature core 3, and the like. (combining jig 10)

As shown in FIGS. 7(a) and 7(b), the combining jig 10 is constructed by a base portion 13, a set of combining blocks 15 fixed to the base portion 13 by bolts 14 or the like, a first coil inserting arrow for inserting the lower coil bar 8 into a coil inserting path 16 formed by the combining blocks 15 and the like.

The base portion 13 is attached with a positioning device and an indexing device of the coil holding member 11 mounted on the base portion 13 (both not illustrated).

The set of combining blocks 15 are installed contiguous to the outer periphery of the coil holding member 11 mounted on the base portion 13, as shown in FIG. 8, the coil inserting path 16 is formed between the both integrating blocks 15 opposed to each other with a predetermined interval therebetween and a space (a slot insulator holding portion 18) for setting the lower layer slot insulator 4 is formed at the midway of the coil inserting path 16. Further, either of the combining blocks 15 is provided with a movable stopper 19 for restraining the movement of the lower layer slot insulator 4.

As shown in FIG. 9, the coil inserting path 16 is constructed by a coil trunk path portion 16a for passing the coil trunk 8a of the lower layer coil bar 8 and a coil arm path portion 16b for passing the coil arm 8b and the projected portion 8c on one side, penetrating from an inlet (right side in FIG. 8) to an outlet.

The coil trunk path portion 16 is formed such that the path direction is directed toward the central portion of the coil holding member 11 mounted on the base portion 13. As shown in FIG. 8, the coil trunk path portion 16a is formed such that an opening width B (distance between the set of combining blocks 15) on the inlet side of the slot insulator holding portion 18 is slightly larger than a width A1 (FIG. 4(*b*)) of the coil trunk 8*a* and such that an opening width C on the outlet side of the slot insulator holding portion 18 is slightly larger than a dimension of the width of the coil trunk 8*a* and two sheets of the lower layer slot insulator 4. Further, a length D (FIG. 9) of the coil trunk path portion 16*a* in the up and down direction is set to be substantially equal to a length A2 (FIG. 4(*c*)) on the inner diameter side of the coil trunk 8*a*.

As shown in FIG. 9, the coil arm path portion 16*b* is installed on the lower side of the coil trunk path portion 16*a*. The upper side of the coil trunk path portion 16*a* is open to upper end faces of both of the combining blocks 15. Thereby, the lower layer coil bar 8 can pass through the coil inserting path 16 while maintaining substantially the same attitude (attitude wherein the coil trunk 8*a* is erected as shown in FIG. 9) without changing the attitude of the lower layer coil bar 8 by moving inner side end faces of the both coil arms 8*b* respectively along end faces of the combining blocks 15 formed at both of upper and lower ends of the coil trunk path portion 16*a*.

As shown in FIG. 8, the slot insulator holding portion 18 is formed in a shape which is opened in a V-like shape to the inlet side at the midway of the coil trunk path portion 16*a* and is provided substantially orthogonally to the path direction (left and right direction in FIG. 9). Further, an opening width E at the front end portion opened in a V-like shape (FIG. 8) is larger than the opening width B on the inlet side of the coil trunk path portion 16*a* and is set to a dimension capable of passing the coil trunk 8*a* with sufficient allowance. Further, a projection 20 for positioning to regulate the lower position of the lower layer slot insulator 4 is installed at the lower portion on the outlet side of the slot insulator holding portion 18 (FIG. 9). Accordingly, the lower layer slot insulator 4 is inserted from the upper side of the combining block 15 into the slot insulator holding portion 18 and is positioned by bringing the lower end portion of the bottom portion into contact with the projection 20. Further, the both side face portions 4*b* of the lower layer slot insulator 4 are maintained to be opened to the outer side in accordance with the shape (shape opened substantially in a V-like shape) of the slot insulator holding portion 18 as shown in FIG. 8.

As shown in FIG. 8 and FIG. 9, the movable stopper 19 is slidably installed to one of the combining blocks 15 such that the movable stopper 19 can be moved in and out to and from the coil trunk path portion 16*a* on the outlet side of the slot insulator holding portion 18. The movable stopper 19 is extracted into the coil trunk path portion 16*a* to restrain the lower layer slot insulator 4 from moving to the outlet side in the coil trunk path portion 16*a* during a time period until the lower layer slot insulator 4 held by the slot insulator holding portion 18 is combined with the lower layer coil trunk 8*a*.

The first coil inserting arrow 17 is insertibly installed from the inlet side of the coil inserting path 16 to the coil trunk path portion 16*a*, combines the lower layer slot insulator 4 with the coil trunk 8*a* by pushing the coil trunk 8*a* of the lower layer coil bar 8 inserted into the coil inserting path 16 and pushes further the coil trunk 8*a* after detaching the movable stopper 19 by which the lower layer slot insulator 4 and the lower layer coil bar 8 can integrally be pushed out to the side of the coil holding member 11.

(coil holding member 11)

As shown in FIGS. 7(*a*) and 7(*b*), the coil holding member 11 is constructed by a plurality (same number as that of the slots 3*a*) of coil holding blocks 21 arranged in the peripheral direction at constant intervals, a top plate 23 fixed to upper end faces of the respective coil holding blocks 21 by bolts 22 (FIG. 10), a bottom plate 25 fixed to lower end faces of the respective coil holding blocks 21 by bolts 24 (FIG. 10) and the like. Further, after receiving the lower layer slot insulators 4 and the lower layer coil bars 8 which have been integrally combined by the combining jig 10, from the combining jig 10, the coil holding member 11 is removed from the base portion 13 and is attached to the coil inserting device 12.

The respective coil holding blocks 21 are arranged proximate to the outer peripheries of the top plate 23 and the bottom plate 25 and a hollow portion 26 (FIG. 10) is formed at the inner peripheries of the respective coil holding blocks 21. Further, a predetermined number (equal to the number of the slots 3*a*) of the coil integrating paths 27 communicating with the hollow portion 26 are installed among the respective coil holding blocks 21 contiguous in the peripheral direction. As shown in an enlarged view in FIG. 11, the coil integrating path 27 is constructed by a coil trunk inserting portion 27*a* to which the lower layer coil trunk 8*a* and the lower layer slot insulator 4 which have integrally been combined are inserted, a lower side coil arm inserting portion 27*b* to which the coil arm 8*b*1 and the projected portion 8*c* on one side are inserted and an upper side arm inserting portion 27*c* to which the coil arm 8*b*2 and the projected portion 8*c* on the other side are inserted.

Figure 11:
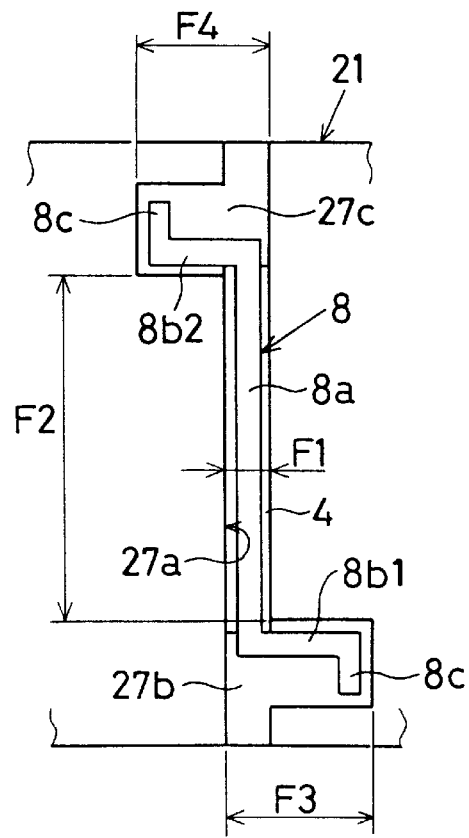
FIG. 11 is an enlarged plan view showing a shape of an opening of a path for integrating coil.

Here, dimensions of respective portions of the coil integrating path 27 are described in reference to FIG. 11.

A width in the peripheral direction (opening width) F1 of the coil trunk inserting portion 27*a* is set to be slightly larger than a dimension of the width A1 of the coil trunk 8*a* plus a thickness of two sheets of the lower layer slot insulator 4 and a dimension F2 in the up and down direction of the coil trunk inserting portion 27*a* is set to be slightly smaller than the distance A2 between the both coil arms 8*b*. Further, a width F3 in the peripheral direction of the lower side coil arm inserting portion 27*b* is set to be slightly larger than the dimension A3 (FIG. 4(*c*)) in the peripheral direction of the coil arm 8*b*1 on one side and a width F4 in the peripheral direction of the upper side coil arm inserting portion 27*c* is set to be slightly larger than A4 (FIG. 4(*b*)) in the peripheral direction of the coil arm 8*b*2 on the other side. The dimension A3 in the peripheral dimension of the coil arm 8*b*1 on one side differs from the dimension A4 in the peripheral dimension of the coil arm 8*b*2 on the other side (A3>A4) and therefore, the width F4 in the peripheral dimension of the upper side coil arm inserting portion 27*c* is set to be larger than the dimension A4 in the peripheral dimension of the coil arm 8*b*2 on the other side and smaller than the dimension A3 in the peripheral dimension of the coil arm 8*b*1 on one side. Thereby, the lower layer coil bar 8 can be prevented from being inserted in the reverse direction.

The dimension A3 in the peripheral dimension of the coil arm 8*b*1 on one side differs from the dimension A4 in the peripheral dimension of the coil arm 8*b*2 on the other side because as shown in FIG. 4(*b*), inclinations of the coil arm 8*b*1 on one side and the coil arm 8*b*2 on the other side in respect of the coil trunk 8*a* differ from each other and the lengths thereof also differ from each other. Accordingly, the respective lower layer coil bars 8 must be integrated to the armature core 3 all in the same direction and therefore, the respective lower layer coil bars 8 must be inserted to the coil integrating paths 27 of the coil holding member 11 respectively in the same direction.

A positioning projection 28 for positioning the coil integrating path 27 in respect of the slot 3*a* of the armature core 3 is fixed to the inner peripheral end of each of the coil holding blocks 21 by soldering or the like. As shown in FIG. 1, the positioning projection 28 can make the peripheral positions of the coil integrating path 27 and the slot 3a coincide with each other in respect of the armature core 3 arranged at the inner periphery (hollow portion 26) of the coil holding member 11 by fitting to a groove 3c in a V-like shape formed between the pair of projection 3b for pressing provided on the outer peripheral face of the armature core 3. Further, the pair of projections 3b for pressing are bent to the side of the slot 3a after integrating the lower layer coil bar 8 and the upper layer coil bar 9 to the armature core 3 to thereby fix the lower layer coil trunk 8a and the upper layer coil trunk 9a both inserted into the slot 3a.

As shown in FIG. 10, the top plate 23 is provided with a spring 29 and a coil stopper 30 urged to the side of the coil holding block 21 by the spring 29. The coil stopper 30 restrains the lower layer coil bar 8 from moving by pressing the lower layer coil bar 8 inserted into the coil integrating path 27 by receiving the urging force of the spring 29. Further, a number (the same as the number of the slots 3a) of the springs 29 or the coil stoppers 30 are installed in correspondence with the respective coil integrating paths 27. A round hole 23a communicating with the hollow portion 26 formed by the respective coil holding blocks 21 is provided at the central portion of the top plate 23. The round hole 23a is provided for attaching the coil holding member 11 where the lower layer slot insulators 4 and the lower layer coil bars 8 have been set in the respective coil integrating paths 27 to the coil inserting device 12 and thereafter attaching the armature core 3 to the coil inserting device 12 by passing the armature core 3 to the inner periphery of the coil holding member 11.

The bottom plate 25 is provided with a centering hole 25a for setting the coil holding member 11 to the coil inserting device 12 and a positioning hole 25b for positioning to the coil inserting device 12 (FIG. 10).

(coil inserting device 12)

Figure 12:
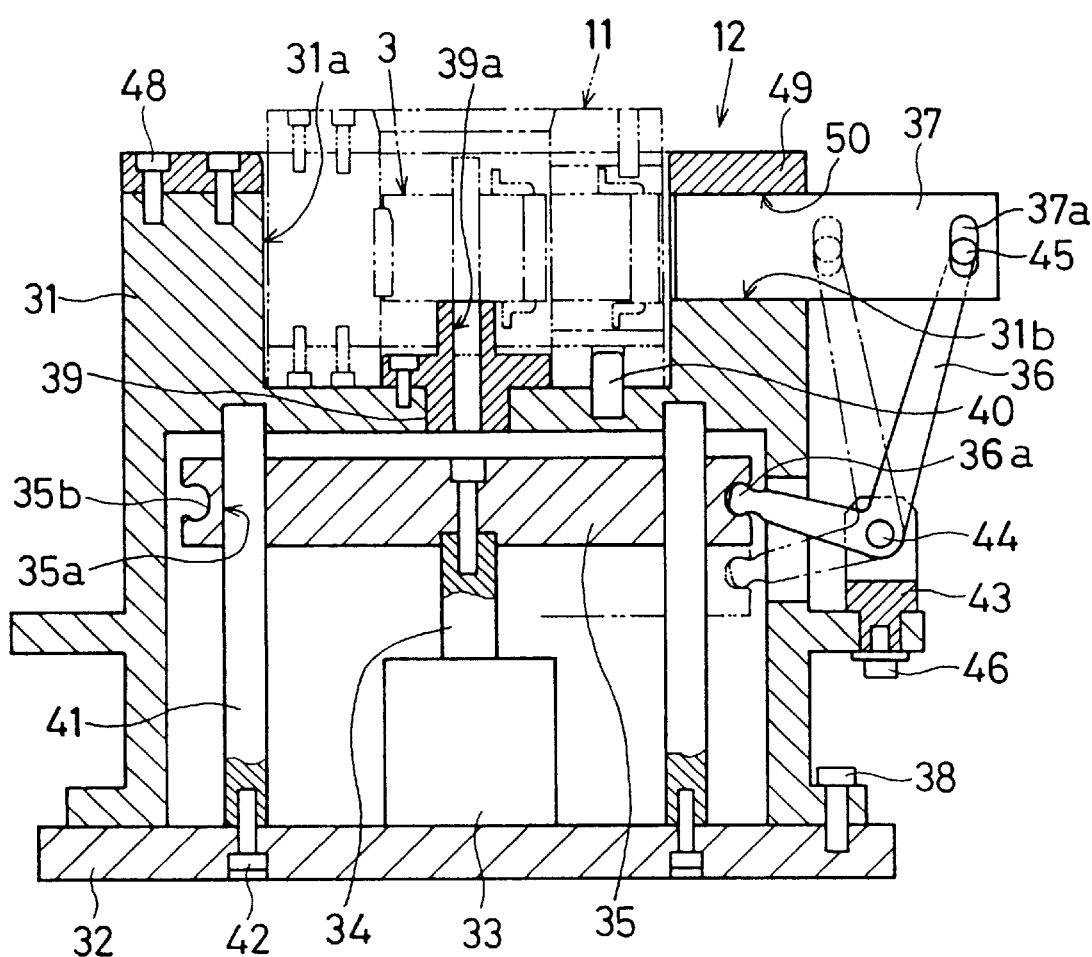
FIG. 12 is a sectional view of a coil inserting apparatus.

As shown in FIG. 12, the coil inserting device 12 is constructed by a frame 31 for setting the coil holding member 11, a cylinder 33 installed at the central portion of a base 32 of the coil inserting device 12, a disk 35 fixed to the front end of a piston rod 34 provided to the cylinder 33, a predetermined number of levers 36 connected to the disk 35, a predetermined number of second coil inserting arrows 37 moved in corporation with the upward and downward movement of the disk 35 via the levers 36 and the like.

The frame 31 is produced in substantially a cylindrical shape and is fixed onto the base 32 by bolts 38. A recessed portion 31a for setting the coil holding member 11 is provided at the upper portion of the frame 31 and a centering projection 39 for centering the coil holding member 11 is fixed to the central portion of the bottom face of the recessed portion 31a. A shaft-fitting hole 39a for fitting the rotating shaft 2 of the armature core 3 is formed at the central portion of the centering projection 39. Further, a positioning pin 40 for fitting to the positioning hole 25b provided at the bottom plate 25 of the coil holding member 11, is attached on the outer peripheral side of the centering projection 39 of the bottom face of the recessed portion 31a.

The cylinder 33 is provided to move the piston rod 34 upwardly and downwardly by pressure operation of an air switch valve, not illustrated.

The disk 35 is provided with a plurality of guide holes 35a at the outer peripheral portion and guide pins 41 are respectively fitted to the respective guide holes 35a. The guide pins 41 are arranged on the outer peripheral side of the cylinder 33 and fixed by bolts 42 in an attitude erected on the base 32 and the upper end portions are supported by the frame 31.

Figure 13:
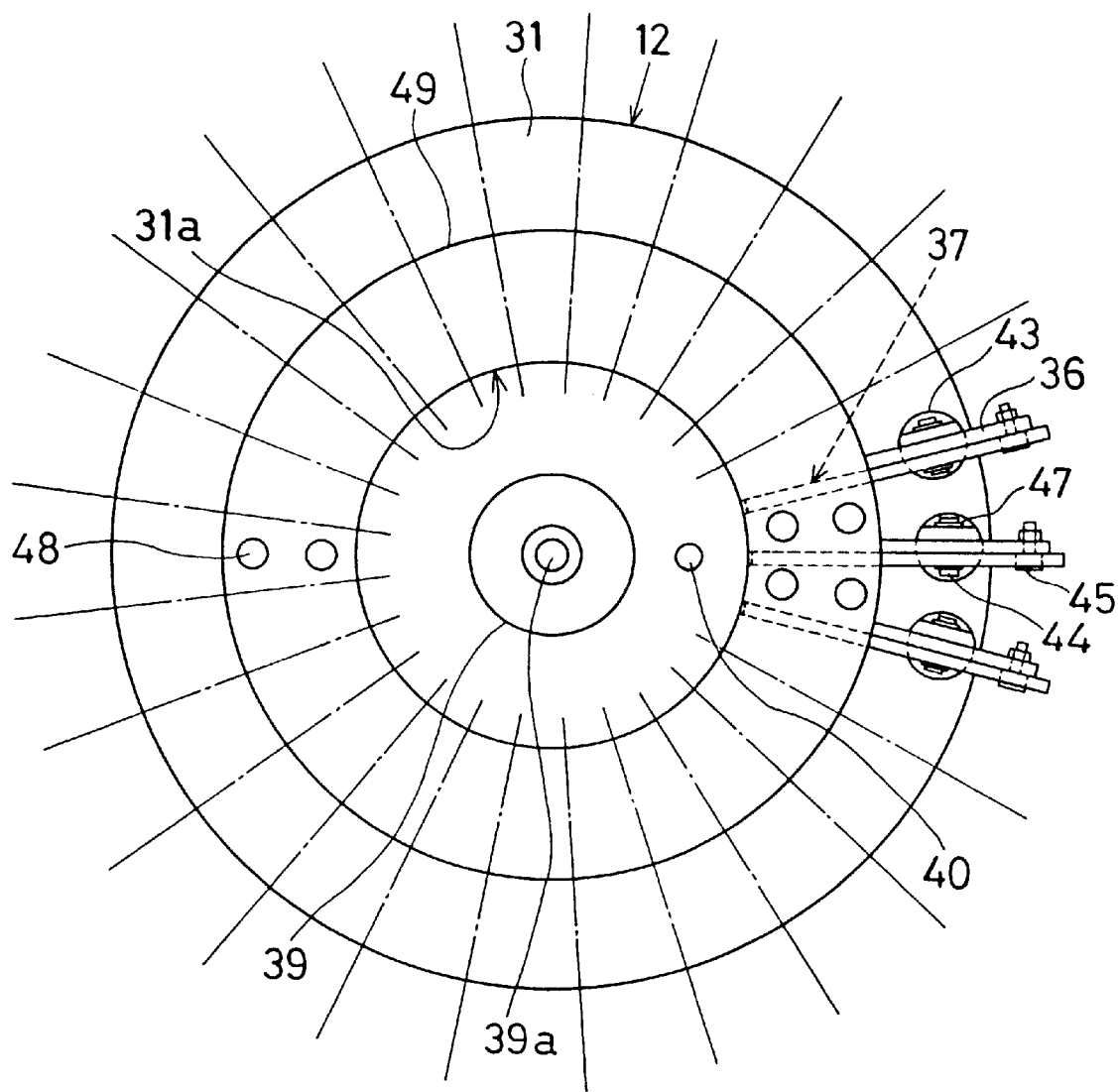
FIG. 13 is a plan view of the coil inserting apparatus.
Figure 14:
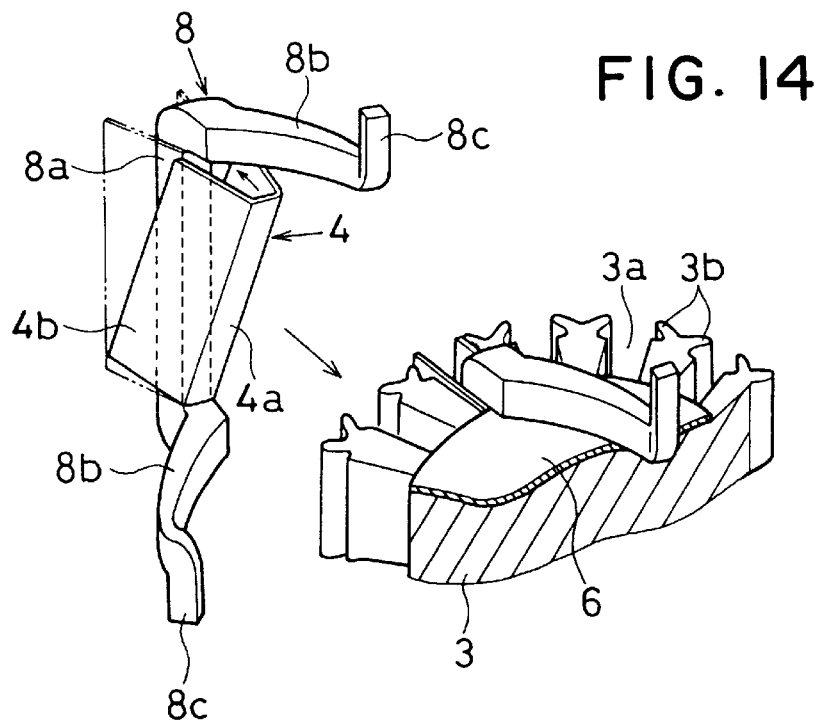
FIG. 14 is a perspective view showing a procedure of combining and inserting a lower layer slot insulator and a lower layer coil bar into a slot (Embodiment 2)

The lever 36 is formed in a hook-like shape (substantially an L-like shape) and is attached rotatably to a lever holding member 43 attached to the outer periphery of the frame 31 via a pin 44 (FIG. 13). In respect of one end side of the lever 36, a front end portion 36a is produced in a rounded shape and is fitted slidably to an outer peripheral groove 35b formed on the outer peripheral face of the disk 35. In respect of the other end side of the lever 36, a cam follower 45 is fixed at the front end portion and the cam follower 45 is fitted to a hole 37a in an elliptical shape provided at the second coil inserting arrow 37.

The lever holding member 43 is fixed to the outer periphery of the frame 31 in correspondence with each of the levers 36 by a bolt 46 or the like. Further, as shown in FIG. 13, the pin 44 is attached to the lever holding member 43 by a circlip 47 or the like.

The second coil inserting arrow 37 is slidably fitted to a groove 31b formed at the wall face forming the recessed portion 31a of the frame 31 and a guide groove 50 formed by an upper plate 49 fixed to the upper end face of the frame 31 by bolts 48 or the like from the outer peripheral side in the radial direction to the central direction.

(a) Steps of integrally combining the lower layer slot insulators 4 and the lower layer coil bars 8 by the combining jig 10 and moving the lower layer slot insulators 4 and the lower layer coil bars 8 to the coil holding member 11 are performed as follows.

First, the lower layer slot insulator 4 is inserted into the slot insulator holding portion 18 formed at the combining blocks 16 and set to a predetermined position. In this case, the lower layer slot insulator 4 can be inserted from the upper outside of the combining jig 10 into the slot insulator holding portion 18 as shown in FIG. 7(b). Or, it may be inserted from the inlet of the coil inserting path 16.

Successively, the lower layer coil bar 8 is inserted from the inlet of the coil inserting path 16 and the coil trunk 8a is pushed to the inner side of the lower layer slot insulator 4 (between a pair of the side face portions 4b) by the first coil inserting arrow 17 thereby combining the lower layer slot insulator 4 and the lower layer coil bar 8. Thereby, the lower layer slot insulator 4 and the coil trunk 8a of the lower layer coil bar 8 are integrally combined in a state where the lower layer slot insulator 4 envelops the coil trunk 8a. Further, the lower layer slot insulator 4 is combined with the coil trunk 8a in a state where the lower layer slot insulator 4 is positioned in respect of the lower layer coil bar 8 since the both ends in the longitudinal direction of the bottom face portion 4a are brought into contact with inner side faces of the both coil arms 8b of the lower layer coil bar 8 and the movement in the longitudinal direction is restricted.

After combining the lower layer slot insulator 4 with the lower layer coil bar 8, the movable stopper 19 is retracted and the restriction of movement of the lower layer slot insulator 4 is released and thereafter, the first coil inserting arrow 17 is pushed further and the lower layer slot insulator 4 and the lower layer coil bar 8 are moved from the coil inserting path 16 to the coil integrating path 27 of the coil holding member 11 and pressed and held by the coil stopper 30 at a predetermined position in the coil integrating path 27.

Further, the coil holding member 11 is positioned at a location where the inlet of one coil integrating path 27 is opposed to the outlet of the coil inserting path 16 by a positioning device, not illustrated (but illustrated in FIG. 8).

When one set of the lower layer slot insulator 4 and the lower layer coil bar 8 are moved from the coil integrating path 27 to the coil inserting path 16, the coil holding member 11 is rotated by 1 slot by an indexing device, not illustrated, and is positioned to a location where the inlet of the successive coil integrating path 27 is opposed to the outlet of the coil inserting path 16.

By repeating the above steps by a predetermined number of slots, all of the lower layer slot insulators 4 and the lower layer coil bars 8 are held in the respective coil integrating paths 27 of the coil holding member 11 in an integrally combining state.

(b) Next, steps of integrating the lower slot insulators 4 and the lower coil bars 8 which have been held by the coil holding member 11 are performed as follows.

The coil holding member 11 where predetermined numbers of the lower layer slot insulators 4 and the lower layer coil bars 8 have been set, is removed from the base 13 of the combining jig 10 and is attached to the coil inserting device 12. In this case, centering is performed by fitting the centering hole 25a provided to the bottom plate 25 of the coil holding member 11 to the centering projection 39 installed to the recessed portion 31a of the frame 31 and the coil holding member 11 is positioned by fitting the positioning pin 40 to the positioning hole 25b of the bottom plate 25. Thereby, the second coil inserting arrow 37 is positioned to the coil integrating path 27 of the coil holding member 11. That is, the peripheral positions of the second coil inserting arrow 37 and the coil integrating path 27 coincide with each other.

Successively, the armature core 3 is attached to the coil inserting device 12. In this case, the armature core 3 is inserted into the inner periphery of the coil holding member 11 by setting the groove 3c in a V-like shape installed on the outer peripheral face of the armature core 3 along the positioning projection 28 of the coil holding member 11 and the rotating shaft 2 is fitted and set to the shaft fitting hole 39a of the centering projection 39. Thereby, as shown in FIG. 1, the slot 3a of the armature core 3 is positioned to the coil integrating path 27 of the coil holding member 11. That is, the peripheral positions of the slot 3a and the coil integrating path 27 coincide with each other.

After setting the coil holding member 11 and the armature core 3 in the coil inserting device 12, the piston rod 34 is lowered by pressure operation of an air switch valve. Thereby, the disk 35 fixed to the piston rod 34 is lowered and therefore, the lever 36 is rotated from a location shown in solid lines in FIG. 12 to a location shown in two-dotted chain lines with the pin 44 as a fulcrum. By rotation of the lever 36, the second coil inserting arrow 37 is pushed to the inner peripheral side in the radial direction (central direction) along the guide groove 50 via the cam follower 45 fixed to the other end portion of the lever 36 and is advanced into the coil integrating path 27 of the coil holding member 11. Thereby, the lower layer coil bar 8 and the lower layer slot insulator 4 held in the coil integrating path 27 are pushed by the second coil inserting arrow 37 and the lower layer slot insulator 4 and the lower layer coil trunk 8a are integrally inserted into the slot 3a of the armature core 3. The coil trunk 8a and the lower layer slot insulator 4 inserted into the slot 3a, are integrated to the bottom of the slot 3a by receiving pressure of the cylinder 33.

Successively, the piston rod 34 is elevated by pressure operation of the air switch valve. Thereby, the disk 35 fixed to the piston rod 34 is elevated and accordingly, the lever 36 connected to the disk 35 is rotated from the location indicated by two-dotted chain lines in FIG. 12 to a location indicated by solid lines with the pin 44 as a fulcrum. By rotation of the lever 36, the second coil inserting arrow 37 is retracted to the outer peripheral side in the radial direction along the guide groove 50 via the cam follower 45 fixed to the other end portion of the lever 36 and is recovered to the stationary position (position shown in FIG. 12).

Thereafter, the armature core 3 and the coil holding member 11 are removed from the coil inserting device 12 and one production cycle is finished.

After integrating all of the lower layer slot insulators 4 and the lower layer coil bars 8 to the armature core 3 by the above steps, all of the upper layer slot insulators 5 and the upper layer coil bars 9 are integrated to the armature core 3 by a similar process. However, although the total configurations of both of the lower layer coil bar 8 and the upper layer coil bar 9 are shaped substantially in a channel-like form, dimensions of respective portions of both are slightly different from each other and therefore, the above combining jig 10 and the above coil holding member 11 and the like are prepared exclusively for the upper layer coil bar 9.

According to the embodiment, after integrally combining the lower layer slot insulator 4 and the lower layer coil bar 8 by the combining jig 10, they are set to the coil integrating path 27 of the coil holding member 11 and therefore, at the time point of inserting them into the slot 3a of the armature core 3, the lower layer slot insulator 4 and the lower layer coil bar 8 are not positionally shifted from each other and further, the positional shift of the lower layer slot insulator 4 in respect of the slot 3a is not also caused. Accordingly, in inserting them to the slot 3a, the lower layer coil bar 8 can be prevented from biting the lower layer slot insulator 4 and the lower layer slot insulator 4 can be prevented from being deformed or destructed. Further, the movement of the lower layer slot insulator 4 is regulated such that the lower layer slot insulator 4 is prevented from moving in the direction of moving the lower layer coil bar 8 until the lower layer slot insulator 4 is combined with the lower layer coil trunk 8a and accordingly, the lower layer slot insulator can be prevented from moving and positionally shifting in the midst of combining the lower layer slot insulator 4 and the lower layer coil trunk 8a and the lower layer slot insulator 4 and the lower layer coil trunk 8a can be combined with certainty. Further, the lower layer coil bar 8 which is set to the coil integrating path 27 of the coil holding member 11 can be maintained in a proper attitude (attitude insertible to the slot 3a) by the spring 19 and the coil stopper 30 and accordingly, failure in insertion to the slot 3a can be dispensed with.

According to the coil integrating device of the embodiment, the lower layer slot insulator 4 and the lower layer coil bar 8 can simultaneously be inserted into the slot 3a and therefore, the step of integrating the coil can be shortened. Specifically, steps of inserting the lower layer slot insulator 4 by itself into the slot 3a, maintaining the lower layer slot insulator 4 inserted into the slot 3a by a jig and separating the jig are dispensed with.

Further, according to the coil integrating device, the lower layer slot insulators 4 having the same number as the number of the slots 3a and the lower layer coil bars 8 having the same number as the number of the slots 3a can be integrated to the armature core 3 in one motion (simultaneously) and therefore, the operational efficiency is excellent and a time period required for the integrating step can be shortened.

Further, even when the size of the lower layer coil bar 8 differs, the production thereof can be dealt with only by preparing the coil holding member 11 exclusive for the size and therefore, a time period for preparing production can significantly be shortened and facility investment can considerably be reduced.

Although according to the embodiment, the lower layer slot insulator 4 and the lower layer coil bar 8 are integrally combined by using the combining jig 10, the lower layer slot insulator 4 and the lower layer coil bar 8 may be combined by manual operation without using such a jig and they may be inserted into the coil integrating path 27 of the coil holding member 11 as they are.

Further, although according to the embodiment, sets of the lower layer slot insulators 4 and the lower layer coil bars 8 which have been combined by the combining jig 10, are inserted into the coil integrating paths 27 of the coil holding member 11 set by set, the combining blocks 15 may be arranged at the entire periphery on the outer side of the coil holding member 11 and the coil inserting paths 16 may be provided for the predetermined number of the slots 3a by which the predetermined numbers of the lower layer slot insulators 4 and the lower layer coil bars 8 may simultaneously be inserted into the coil integrating paths 27 of the coil holding member 11.

The steps of attaching and detaching the coil holding member 11 and the armature core 3 to and from the coil inserting device 12 may be carried out by manual operation or automatically. Further, the positioning and indexing the coil holding member 11 in respect of the combining jig 10 may be carried out manually or automatically.

Although according to the embodiment, as a method of positioning the coil holding member 11 in respect of the armature core 3, the positioning projection 18 provided at the inner periphery of the coil holding member 11 is fitted to the groove 3c in a V-like shape provided on the outer peripheral face of the armature core 3, the other positioning method may be adopted. For example, a hole may be formed at a rotor portion of the armature core 3 and a positioning pin for fitting to the hole may be provided to the coil holding member 11. Alternatively, in press-fitting the armature core 3 to the rotating shaft 2, the press-fitting operation may be carried out by positioning the slot 3a of the armature core 3 to a gear 2a (FIG. 2) provided to the rotating shaft 2 and positioning projections for fitting to the gear may be provided to the coil holding member 11.

Although according to the embodiment, the coil holding member 11 is positioned to the coil inserting device 12 and the coil holding member 11 and the armature core 3 are positioned to each other by which the peripheral positions of the slot 3a of the armature core 3, the coil integrating path 27 of the coil holding member 11 and the second coil inserting arrow 37 of the coil inserting device 12 are aligned, the other positioning method may be adopted. For example, the coil holding member 11 and the armature core 3 may separately be positioned to the coil inserting device 12. In this case, it is not necessary to directly position the coil holding member 11 to the armature core 3.

The method of positioning the coil holding member 11 to the armature core 3 is applicable to the method of positioning the armature core 3 to the coil inserting device 12.

EMBODIMENT 2

According to the embodiment, the slot insulator holding portion 18 formed at the combining blocks 15 is formed at the midway of the coil trunk path portion 16a in a shape opened in a V-like form and is inclined by a predetermined angle.

A step of integrally combining the lower layer slot insulator 4 and the lower layer coil bar 8 is performed as follows.

Figure 15:
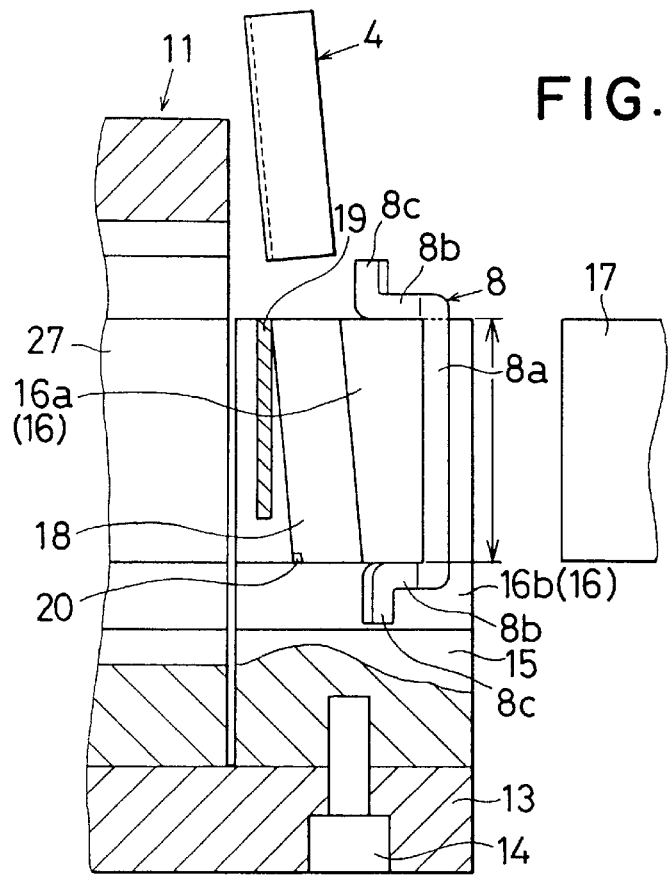
FIG. 15 is a longitudinal sectional view of essential portions of a combining jig.

First, the lower layer slot insulator 4 is inserted to the slot insulator holding portion 18 formed in the combining blocks 15 and is set to a predetermined position. As shown in FIG. 15, the lower layer slot insulator 4 can be inserted into the slot insulator holding portion 18 from above the combining blocks 15. Alternatively, it may be inserted from the inlet of the coil inserting path 16. Further, the lower layer slot insulator 4 set to the slot insulator holding portion 18 is held in an attitude inclined by a predetermined angle.

Successively, the lower layer coil bar 8 is inserted from the inlet of the coil inserting path 16 and the coil trunk 8a is pushed into the inner side (between pair of side face portions 4b) of the lower layer slot insulator 4 by the first coil inserting arrow 17 by which the lower layer slot insulator 4 and the lower layer coil bar 8 are combined.

Figure 16:
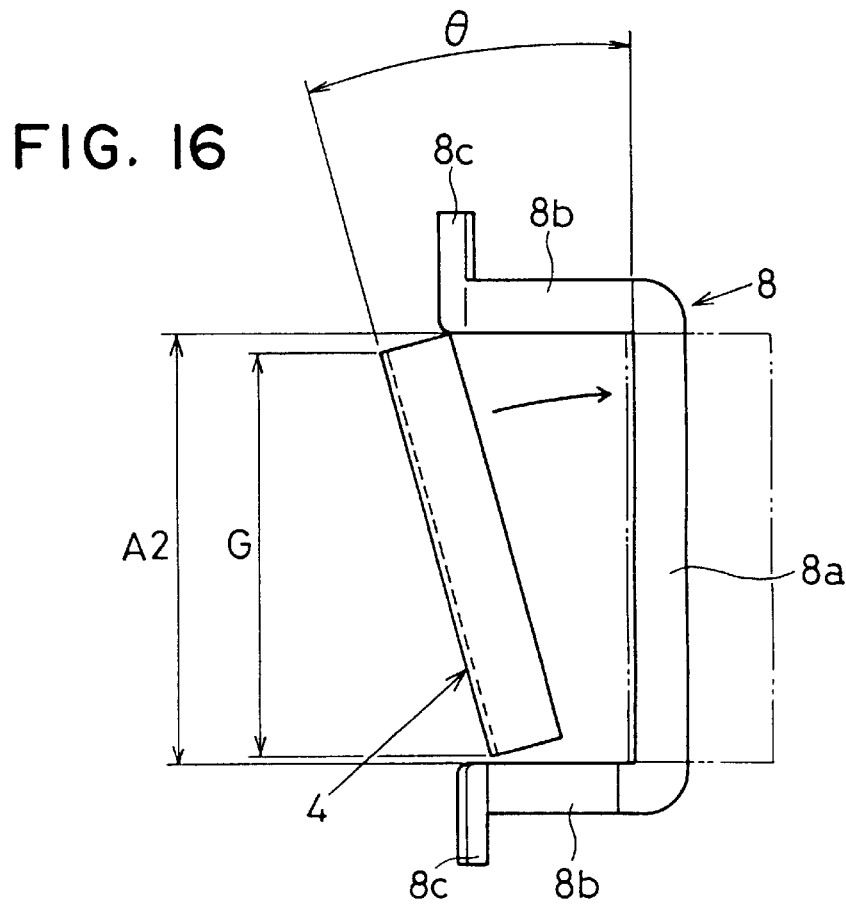
FIG. 16 is a side view showing a step of combining the lower layer slot insulator and the lower layer coil bar.

In more detail, as shown in FIG. 16, the lower layer slot insulator 4 is held in an attitude inclined to the lower layer coil trunk 8a by a predetermined angle $\theta$ and therefore, firstly, the lower end portion on the inner side of the coil trunk 8a is brought into contact with the lower end portion of the bottom portion of the lower layer slot insulator 4. When the lower layer coil bar 8 is pushed further, the lower layer slot insulator 4 envelops the coil trunk 8a by changing the attitude in a direction of reducing the inclination of the predetermined angle with a portion thereof in contact with the coil trunk 8a as a fulcrum. At this moment, the lower layer slot insulator 4 is combined with the coil trunk 8a in a state where it is positioned to the lower layer coil bar 8 since both ends in the longitudinal direction of the bottom face portion 4a is brought into contact with the inner side faces of the both coil arms 8b of the lower layer coil bar 8 and the movement in the longitudinal direction is restricted.

Thereafter, similarly to the first embodiment, after the movable stopper 19 is retracted and the restriction of the movement of the lower layer slot insulator 4 is released, the first coil inserting arrow 17 is pushed further and the lower layer slot insulator 4 and the lower layer coil bar 8 are moved from the coil inserting path 16 to the coil integrating path 27 of the coil holding member 11.

According to the embodiment, not only an effect similarly to that of the first embodiment is achieved but an effect in respect of the following point is achieved. That is, as shown in FIG. 16, the lower layer slot insulator 4 is held in the inclined attitude and therefore, in the attitude of inclining by the predetermined angle $\theta$, a dimension G of the lower layer slot insulator 4 in the up and down direction is smaller than the distance A2 between both of the coil arms 8b. Therefore, when the coil trunk 8a approaches the lower layer slot insulator 4, the both members do not interfere with each other and the coil trunk 8a can smoothly enter the inner side of the lower layer slot insulator 4. Thereafter, the lower layer slot insulator 4 is combined with the coil trunk 8a by changing the attitude in the direction of reducing the inclination of the predetermined angle with the portion where the lower layer slot insulator 4 is brought into contact with the coil trunk 8a as the fulcrum and therefore, the both members are not positionally shifted in the longitudinal direction and the both members can be combined with a proper positional relationship.

EMBODIMENT 3

In this embodiment, the lower slot insulator 4 and the lower layer coil bar 8 are combined in the coil integrating path 27 of the coil holding member 11 without using the combining jig 10 described in the first embodiment and the second embodiment, and are inserted to the slot 3a as they are.

Figure 19:
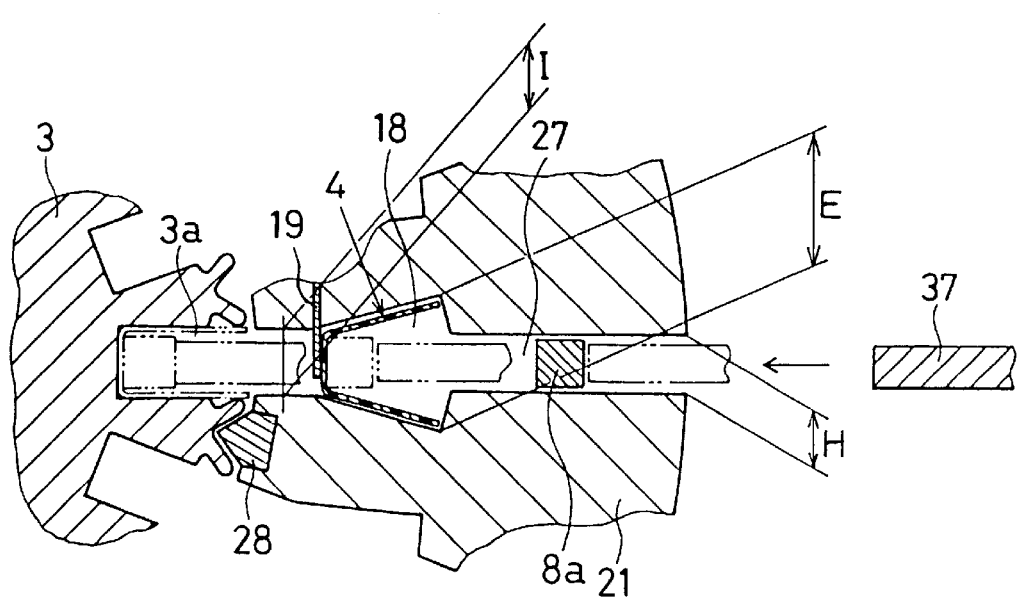
FIG. 19 is a sectional view showing a step of combining and inserting a lower layer insulator and a lower layer coil bar into a slot.

According to the coil holding member 11, the coil integrating paths 27 are formed among the coil holding blocks 21 arranged in the circumferential direction at constant intervals and at the midway of each of the coil integrating paths 27, a space (slot insulator holding portion 18) for setting the lower layer slot insulator 4 is provided. As shown in FIG. 19, in respect of the coil integrating path 27, the opening width H on the inlet side of the slot insulator holding portion 18 is formed to be slightly larger than the width A1 of the coil trunk 8*a* and the opening width I on the outlet side of the slot insulator holding portion 18 is formed to be slightly larger than a dimension of the width A1 of the coil trunk 8*a* plus a thickness of two sheets of the lower layer slot insulator 4.

Figure 17:
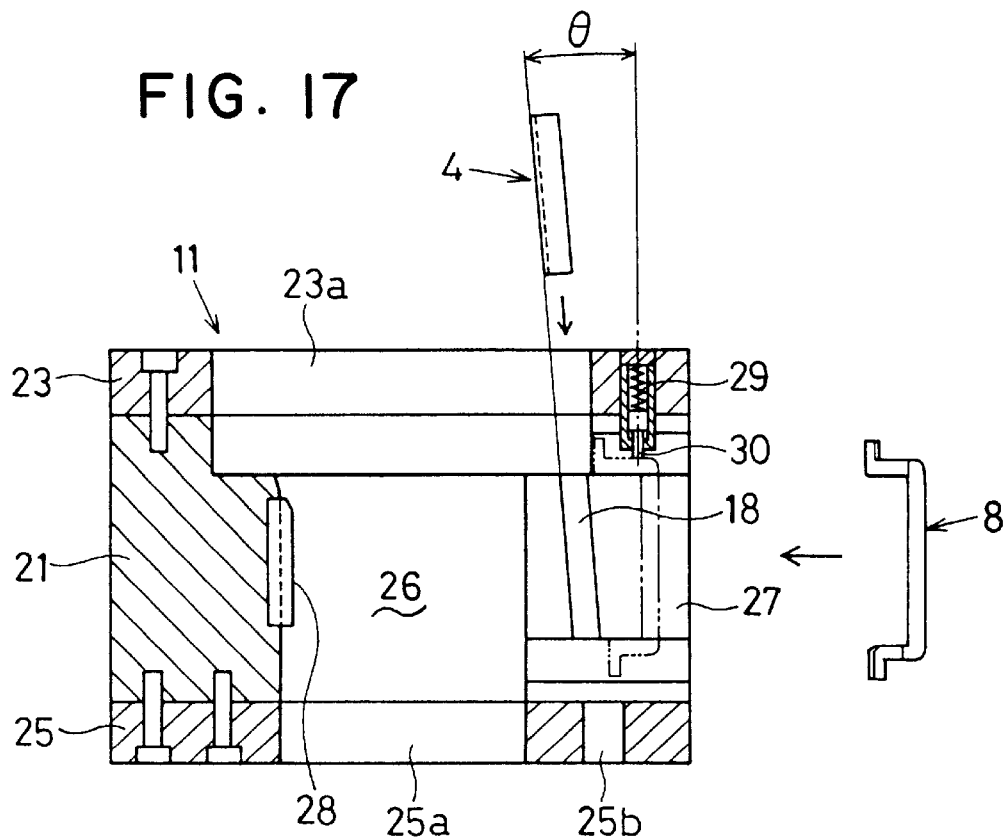
FIG. 17 is a sectional view of a coil holding member (Embodiment 3)

As shown in FIG. 19, the slot insulator holding portion 18 is provided with a section thereof in a form opened in a V-like shape toward the inlet side of the coil integrating path 27 and is inclined by a predetermined angle θ to the coil trunk 8*a* of the lower layer coil bar 8 held at the coil integrating path 27 (FIG. 17). Further, a projection (not shown) for positioning to regulate the lower position of the lower layer slot insulator 4 is provided at the lower end portion of the outlet side of the slot insulator holding portion 18.

Similarly to the first embodiment, the movable stopper 19 (FIG. 19) for restricting the movement of the lower layer slot insulator 4 during a time period until the lower layer slot insulator 4 is combined with the coil trunk 8*a*, is slidably provided.

A step of setting the lower layer slot insulator 4 and the lower layer coil bar 8 to the coil holding member 11 is performed as follows.

As shown in an arrow mark in FIG. 17, the lower layer insulator 4 can be inserted into the slot insulator holding portion 18 from the upper side in the axial direction of the coil holding member 11. Alternatively, the lower layer slot insulator 4 may be inserted into the coil integrating path 27 from the outer peripheral side in the radial direction of the coil holding member 11 (that is, inlet of the coil integrating path 27) before inserting the lower layer coil bar 8 into the coil integrating path 27 and may be set to the slot insulator holding portion 18 by passing through the path as it is. The lower layer slot insulator 4 inserted into the slot insulator holding portion 18 can be held at a predetermined portion by bringing a portion thereof into contact with a projection for positioning provided at the coil holding block 21.

Figure 18:
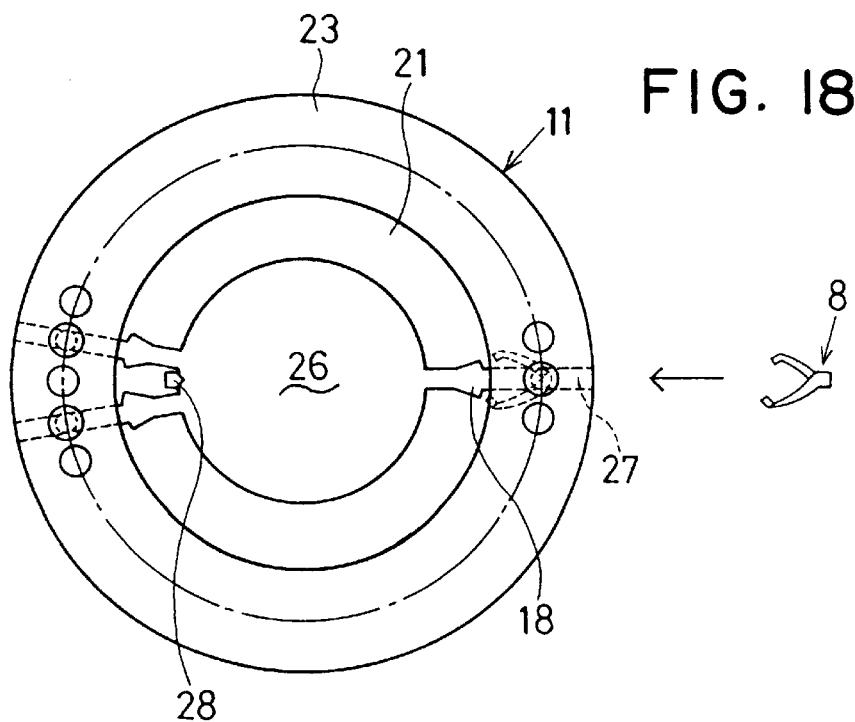
FIG. 18 is a plan view of the coil holding member.

As shown in arrow marks in FIG. 17 and FIG. 18, after setting the lower layer slot insulator 4 to the slot insulator holding portion 18, the lower layer coil bar 8 is inserted into the coil integrating path 27 from the outer peripheral side in the radial direction of the coil holding member 11 and is held at a predetermined position in the coil integrating path 27 (inlet side of slot insulator holding portion 18) by being pressed by the coil stopper 30 provided at the coil holding member 11.

When all of predetermined numbers of the lower layer slot insulators 4 and the lower layer coil bars 8 have been set to the coil holding member 11, the coil holding member 11 and the armature core 3 are respectively attached to the coil inserting device 12 similarly to the first embodiment.

Successively, after positioning the coil integrating paths 27 of the coil holding member 11, the second coil inserting arrows 37 of the coil inserting device 12 and the slots 3*a* of the armature core respectively to each other, the lower layer coil bars 8 are pushed to the inner peripheral side in the radial direction by operating the second coil inserting arrows 37. Thereby, since each of the lower layer slot insulators 4 is set in an attitude inclined to the coil trunk 8*a*, the lower end portion of the lower layer coil trunk 8*a* is brought into contact with the lower end portion of the lower layer slot insulator 4 and thereafter, when the lower layer coil bar 8 is pushed further, with the movement of the lower layer coil bar 8, the lower layer slot insulator 4 is rotated to nullify the predetermined angles θ and the coil trunk 8*a* is pushed to the inner side of the lower layer slot insulator 4 to be enveloped by the lower layer slot insulator 4. In this case, the movement of the lower layer slot insulator 4 in the longitudinal direction is restricted by bringing both end faces thereof in the longitudinal direction into contact with inner side faces of both of the coil arms 8*b* of the lower layer coil bar 8. That is, the lower layer slot insulator 4 can hold the coil trunk 8*a* in a state positioned to the lower layer coil bar 8.

At this time point, the lower layer coil bar 8 and the lower layer slot insulator 4 are combined and thereafter, the lower layer slot insulator 4 and the coil trunk 8*a* are integrally inserted into the slot 3*a*.

According to the embodiment, after setting respectively the lower layer slot insulator 4 and the lower layer coil bar 8 to the coil holding member 11 and combining the lower layer slot insulator 4 and the coil trunk 8*a* by operating the second coil inserting arrow 37, the both members can integrally be inserted into the slot 3*a*. Thereby, similarly to the first embodiment, the lower layer slot insulator 4 is not positionally shifted from the slot 3*a* in the axial direction and the lower layer slot insulator 4 and the lower layer coil bar 8*a* can be inserted into the slot 3*a* with certainty. Further, the lower layer slot insulator 4 is not positionally shifted from the lower layer coil trunk 8*a* and the both members can be combined in a proper positional relationship.

Further, the lower layer slot insulator 4 and the lower layer coil bar 8 can separately be set to the coil holding member 11 and therefore, when the setting operation is performed automatically, the facility is simplified by dividing the step of setting operation and the integrating operation can be performed at higher speed.

EMBODIMENT 4

Figure 20:
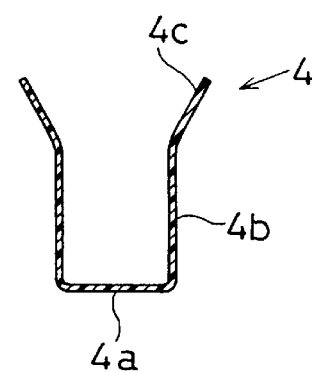
FIG. 20 is a front view of a lower layer slot insulator in the longitudinal direction (Embodiment 4)
Figure 21:
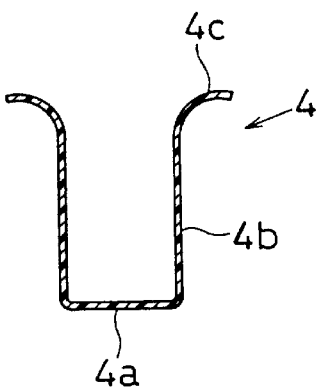
FIG. 21 is a front view of a lower layer slot insulator in the longitudinal direction.

In this embodiment, as shown in FIG. 20, in respect of the lower layer slot insulator 4, front end sides 4*c* are bent to the outer side by an arbitrary angle from midways of both of the side face portions 4*b*. Alternatively, as shown in FIG. 21, the front end sides 4*c* are shaped in a form bent to the outer side by an arbitrary radius of curvature from the midways of both of the side face portions 4*b*.

Figure 22:
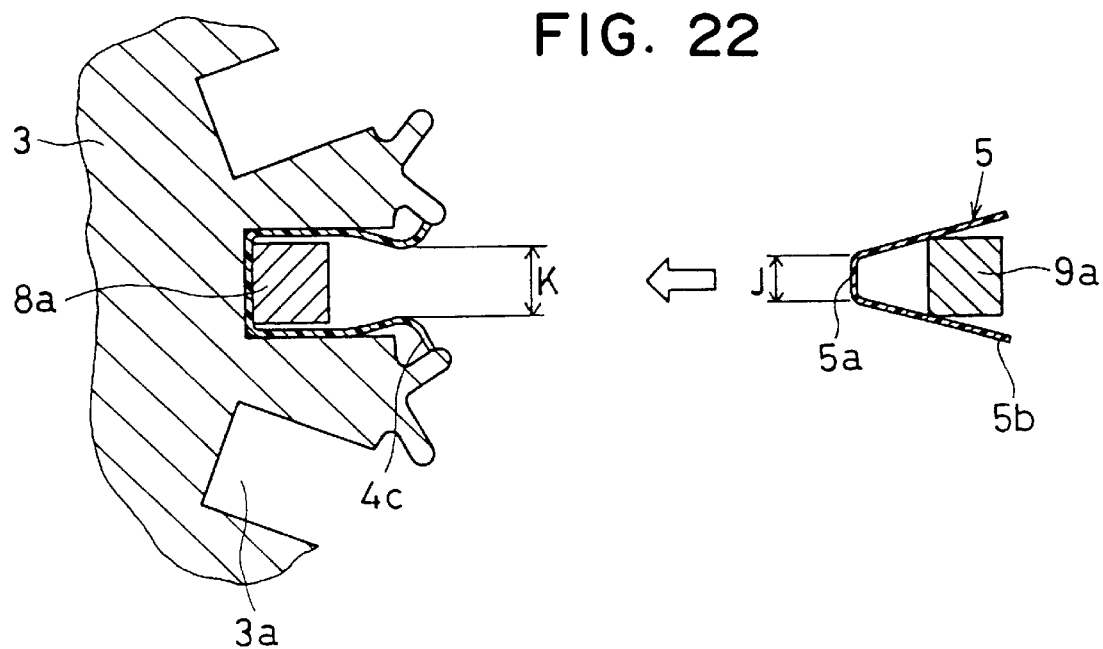
FIG. 22 is a sectional view showing a step of combining and inserting an upper layer slot insulator and an upper layer coil bar into a slot.

Meanwhile, as shown in FIG. 22, in respect of the upper layer slot insulator 5, the section is bent substantially in a U-like shape and both of the side face portions 5*b* are shaped in a form slightly opened toward the outer side. Further, the width J on the outer side of the bottom portion 5*a* of the upper layer slot insulator 5 is set to be smaller than a minimum width K of the inner side of the opening portion of the lower layer slot insulator 4.

In the integrating method of the embodiment, the lower layer slot insulator 4 and the lower layer coil trunk 8*a* are combined and the both members are integrally inserted into the slot 3*a* by either of the methods explained in the first embodiment through the third embodiment.

After integrating predetermined numbers of the lower layer slot insulators 4 and the lower layer coil bars 8, the upper layer slot insulators 5 are combined with the coil trunks 9*a* to envelop the coil trunks 9*a* of the upper layer coil bars 9 and the combined sets of upper layer slot insulators 5 and coil trunks 9*a* are inserted integrally into the slots 3*a* from the outer peripheral side in the radial direction of the armature core 3 as shown in FIG. 22.

According to the embodiment, the front end sides 4*c* are bent to the outer side by an arbitrary angle from midways of both of the side face portions 4b of the lower layer slot insulator 4. Alternatively, the front end sides 4c are shaped in a form bent to the outer side by an arbitrary radius of curvature from the midways of both of the side face portions 4b. Therefore, when the upper layer slot insulator 5 and the upper layer coil trunk 9a are integrally inserted into the slot 3a, there occurs no possibility that the edge portions of the opening of the lower layer slot insulator 4 are caught in. Further, the width J of the outer side of the bottom portion 5a of the upper layer slot insulator 5 is set to be smaller than the minimum width K of the inner side of the opening portion of the lower layer slot insulator 4 and therefore, the bottom face portion 5a of the upper layer slot insulator 5 does not interfere with the edge portions of the opening of the lower layer slot insulator 4 and can smoothly be inserted to the inner side of the opening portion of the lower layer slot insulator 4.

According to this embodiment, when the upper layer slot insulator 5 and the upper layer coil trunk 9a are inserted into the slot 3a, the insulator holding member for holding the lower layer slot insulator 4 is not needed and therefore, the cost can be reduced thereby. Further, when the insulator holding member is not used, a failure in holding the lower layer slot insulator 4 by the insulator holding member does not occur and deformation or destruction of the lower layer slot insulator 4 caused by the holding failure can be prevented.

EMBODIMENT 5

According to the embodiment, predetermined numbers of the lower layer slot insulators 4 and the lower layer coil bars 8 are integrated to the armature core 3 by the method of the first embodiment or the second embodiment. Thereafter to integrate the outer side ring-like insulator 7 (FIG. 26 and FIG. 27) is fitted to the outer diameter sides of the projected portions 8c of the respective lower layer coil bars 8.

The integrating device for integrating the outer side ring-like insulator 7 includes core holding means 51, coil pressing means (mentioned below) and outer diameter guides 52.

(a) The core holding means 51 is formed by a frame in a substantially cylindrical shape having a bottom face. The core holding means will be referred to as frame 51.

Figure 23:
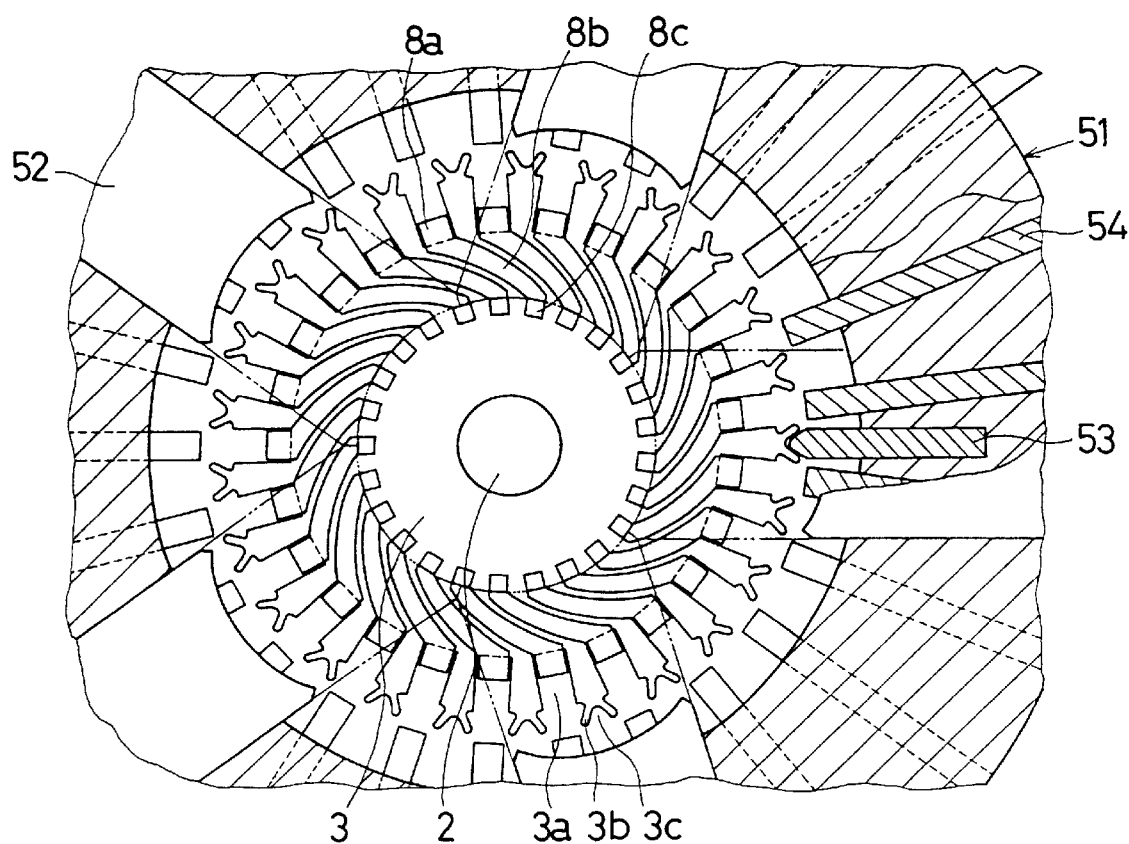
FIG. 23 is an enlarged sectional view showing essential portions of an integrating apparatus of an outer side ring-like insulator (Embodiment 5)
Figure 24:
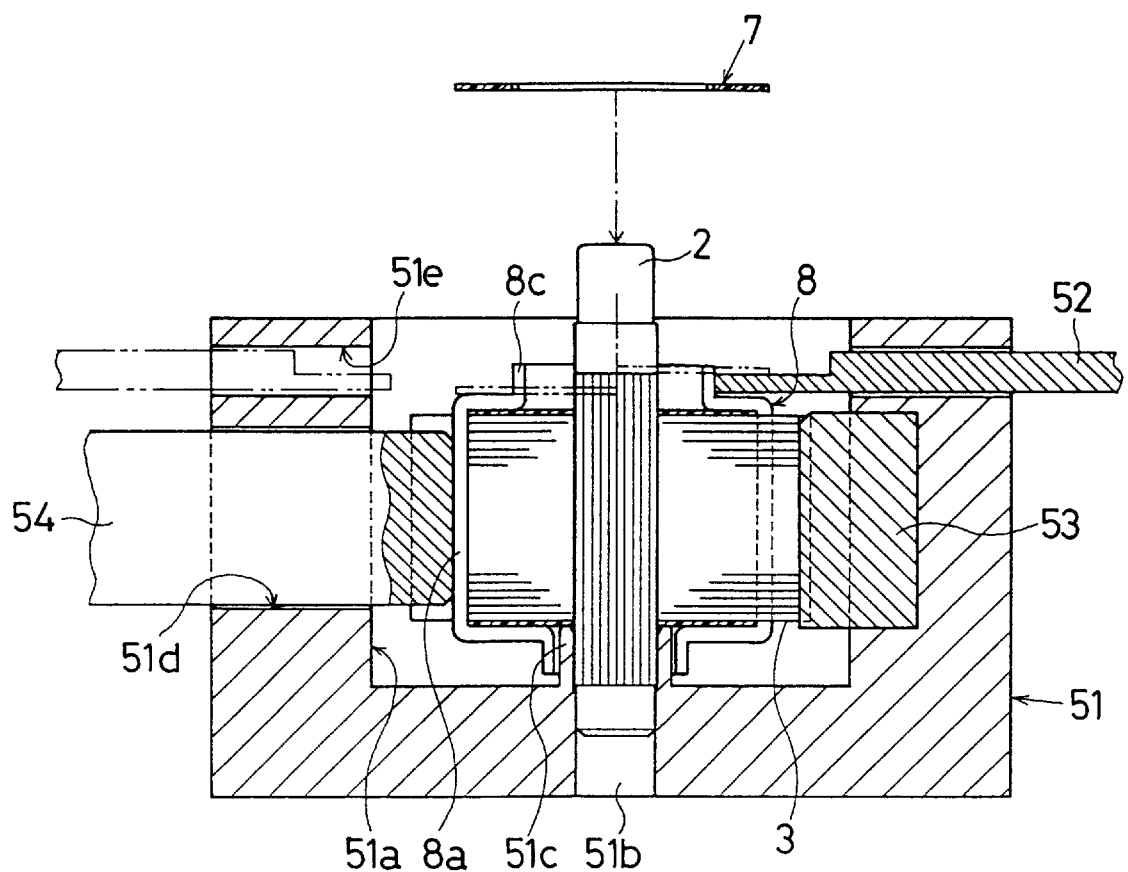
FIG. 24 is an enlarged sectional view of the integrating device.

As shown in FIG. 24, a recessed portion 51a for incorporating the armature core 3 is provided to the frame 51 and a cylindrical wall portion 51c where a positioning hole 51b for supporting the rotating shaft 2, is provided at the central portion of the bottom face of the recessed portion 51a. Further, as shown also by FIG. 23, a positioning projection 53 for positioning the armature core 3 in the peripheral direction is provided at a predetermined position of the frame 51 in the peripheral direction. In respect of the positioning projection 53, the front end is projected by a predetermined length from the inner peripheral face of the recessed portion 51a toward the center direction and the sectional shape of the front end portion is formed substantially in a V-like shape.

Further, in the frame 51, guide holes 51d having the same number as the number of the slots 3a of the armature core 3 are provided to penetrate radially the frame 51 centering on the positioning hole 51b. The respective guide holes 61d are arranged at an equal pitch in the peripheral direction with the positioning projection 53 as a reference and are provided such that the positions of the respective guide holes 51d coincide with the slots 3a of the armature core. Further, on the upper side (upper side in FIG. 24) of the guide holes 51d of the frame 51, a plurality of guide holes 51e for holding the outer diameter guides 52 are provided to radially penetrate the frame 51 centering on the positioning hole 51b.

(b) The coil pressing means is constructed by coil inserting arrows 54 in a plate-like shape respectively arranged slidably to the respective guide holes 51d provided to the frame 51 and a driving device (not illustrated) for simultaneously driving the respective coil inserting arrows 54. The coil pressing means can push the respective lower layer slot insulators 4 and lower layer coil trunks 8a to inner bottom portions of the slots 3a of the armature core 3 by pressing a predetermined number of the lower layer coil bars 8 substantially uniformly by simultaneously advancing the respective coil inserting arrows 54 in the guide holes 51d toward the central direction by the driving device.

Figure 25:
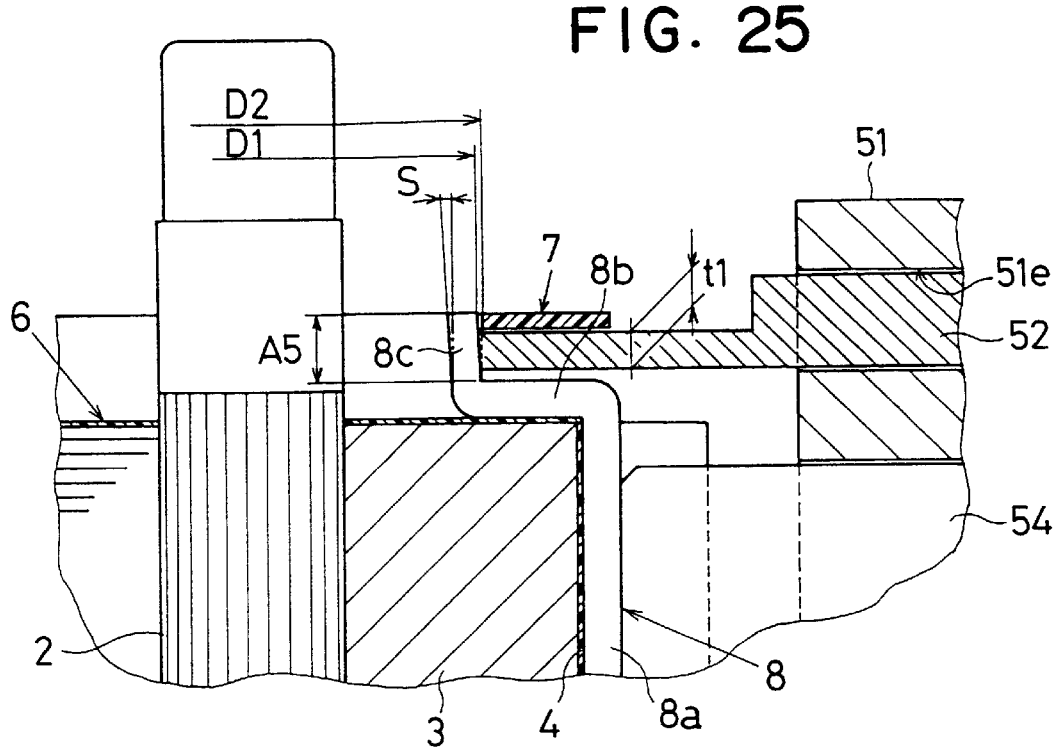
FIG. 25 is an enlarged sectional view showing a step of integrating the outer side ring-like insulator.

(c) As shown in FIG. 24, the outer diameter guides 52 are respectively arranged slidably to the respective guide holes 51e provided to the frame 51. After integrating predetermined numbers of the lower layer slot insulators 4 and the lower layer coil bars 8 to the armature core 3, the outer diameter guides 52 push the projected portions 8c from the outer side to the inner side such that the outer diameter of the projected portions 8c is regulated to a predetermined dimension D1 that is smaller than an inner diameter dimension D2 of the outer side ring-like insulator 7 (FIG. 25).

The shape of the inner periphery of the front end of the outer diameter guide 52 is constructed in a circular arc shape such that the plurality of lower layer projected portions 8c can be pressed uniformly (FIG. 23). Specifically, the shape of the inner periphery is a circular arc shape defined by equally dividing a circular arc shape formed by predetermined positions (positions shown in two-dotted chain lines in FIG. 23) for pressing the projected portions 8c. Further, as shown in FIG. 25, in respect of the outer diameter guide 52, a thickness t1 of the front end portion is set to be smaller than a length A5 of the projected portion 8c in the axial direction and the outer diameter guide 52 is provided to press the inner side (lower side in FIG. 25) from the front end face (upper end face in FIG. 25) of the projected portion 8c by a predetermined dimension (for example, equal to or larger than a thickness t2 of outer side ring-like insulator 7).

Figure 26:
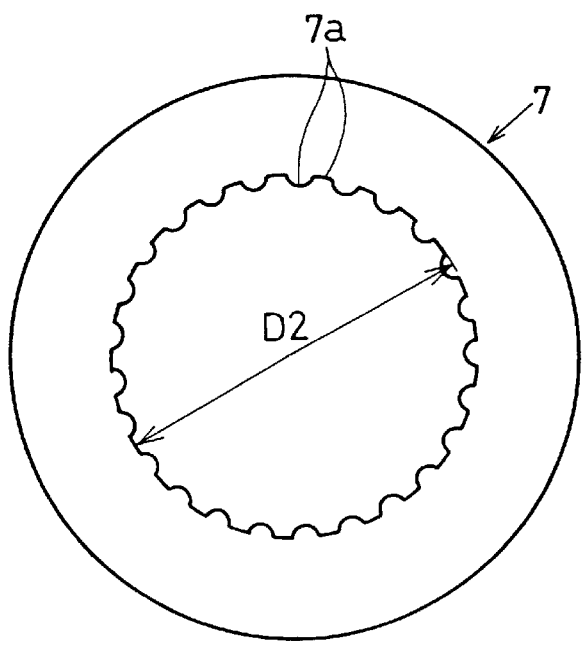
FIG. 26 is a plan view of the outer side ring-like insulator.
Figure 27:
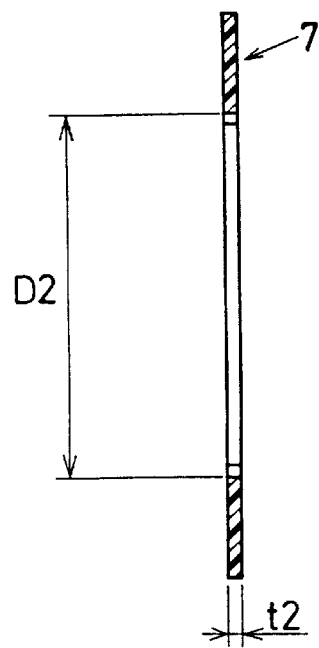
FIG. 27 is a sectional view of the outer side ring-like insulator.

As shown in FIG. 2, the outer side ring-like insulator 7 is fitted to the outer diameter portion of the lower layer projected portion 8c, interposed between the coil arm 8b of the lower layer coil bar 8 and the coil arm 9b of the upper layer coil bar 9 for insulating the both members from each other and is produced by, for example, a baked material of thermosetting resin laminated plates or the like. As shown in FIG. 26 and FIG. 27, the outer side ring-like insulator 7 is formed in a ring-like shape of a thin plate (thickness; t2) and a number of recesses and projections 7a are provided at the inner peripheral edge and the recesses and projections 7a are fitted to the respective projected portions 8c.

A method of integrating the outer side ring-like insulator 7 is performed as follows.

First, while engaging the grooves 3c in a V-like shape formed by the projections 3b for pressing of the armature core 3 to the front end portions of the positioning projections 53 provided to the frame 51, the end of the rotating shaft 2 is inserted into the positioning hole 51b of the cylindrical wall portion 51c provided to the frame 51 to thereby hold the armature core 3. Thereby, the peripheral positions of the slots 3a of the armature core 3 and the coil inserting arrows 54 coincide with each other.

Successively, the coil inserting arrows are advanced (moved in the guide holes 51e from outer side to inner side in the radial direction) by the driving device of the coil pressing means and the lower layer slot insulators 4 and the coil trunks 8*a* of the lower layer coil bars 8 are pressed to the bottom portions in the slots 3*a*. Thereby, the positions of the projected portions 8*c* in the radial direction and in the peripheral direction are respectively regulated.

Successively, while maintaining the state where the lower layer coil trunks 8*a* are pressed to the bottom portions of the slots 3*a* by the coil inserting arrows 54, the outer diameter guides 52 are advanced from the outer side to the inner side in the radial direction to press the projected portions 8*c* and the front ends of the projected portions 8*c* are bent by a predetermined amount S in the elasticity limit of the lower layer coil bars 8 (FIG. 25). Thereby, the outer diameter of the projected portion 8*c* is regulated to the predetermined dimension D1 that is smaller than the inner diameter dimension D2 of the outer side ring-like insulator 7.

Successively, while pressing the projected portions 8*c* by the outer diameter guides 52, the outer side ring-like insulator 7 is fitted to the outer diameter portions of the projected portions 8*c* from the outer side of the outer diameter guides 52. Thereafter, when the outer diameter guides 52 are retracted to the outer side in the radial direction, the projected portions 8*c* of the lower layer coil bars 8, the positions of which have been regulated within the elasticity limit, are recovered to positions of the inner diameter dimension D2 of the outer side ring-like insulator 7 by springback.

Successively, the outer side ring-like insulator 7 is pushed to the roots of the projected portions 8*c* by pressing means, not illustrated, and thereafter, the coil inserting arrows 54 are retracted to the outer side in the radial direction and the armature core 3 which is mounted with the outer side ring-like insulator 7 is taken out from the frame 51. The operation of integrating the outer side ring-like insulator 7 may be carried out by manual operation.

According to the embodiment, by significantly changing the fitting clearance between the outer diameter of the projected portions 8*c* and the inner diameter of the outer side ring-like insulator 7 by pressing the projected portions 8*c* to the direction of the axis center by the outer diameter guides 52, the fitting operation for fitting the outer side ring-like insulator 7 to the outer diameter portions of the projected portions 8*c* can be carried out easily and efficiently. Thereby, the outer side ring-like insulator 7 can be prevented from interfering with the projected portions 8*c* and therefore, the outer side ring-like insulator 7 can be prevented from cracking or chipping.

Further, although according to the embodiment, the shape of the inner periphery of the front end of the outer diameter guide 52 is constructed by a circular arc shape, recessed and projected portions may be formed on the inner periphery of the outer diameter guide 52 and the recessed and projected portions may be fitted to the respective projected portions 8*c* when the projected portions 8*c* are pressed. In this case, dispersion of positions of the projected portions 8*c* in the radial direction and in the peripheral direction can be regulated further accurately by the recessed and projected portions of the outer diameter guide 52 and therefore, the operation of fitting the outer side ring-like insulator 7 can be carried out easily and efficiently.

EMBODIMENT 6

In this embodiment, a set of the lower layer coil bar and the upper layer coil bar are integrally formed as a single conductor.

Figure 28:
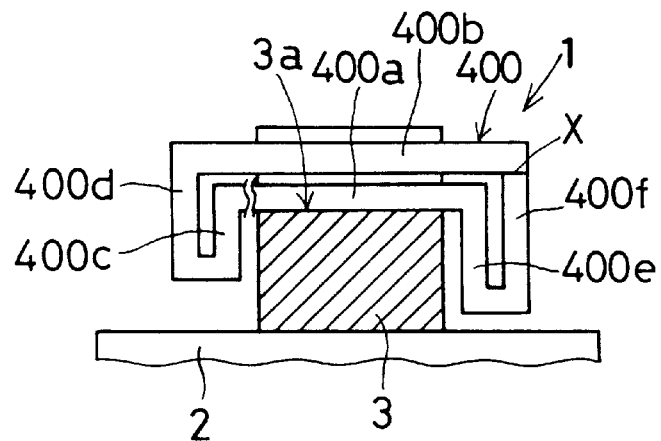
FIG. 28 is a half-cut sectional view of a rotor (Embodiment 6)
Figure 29:
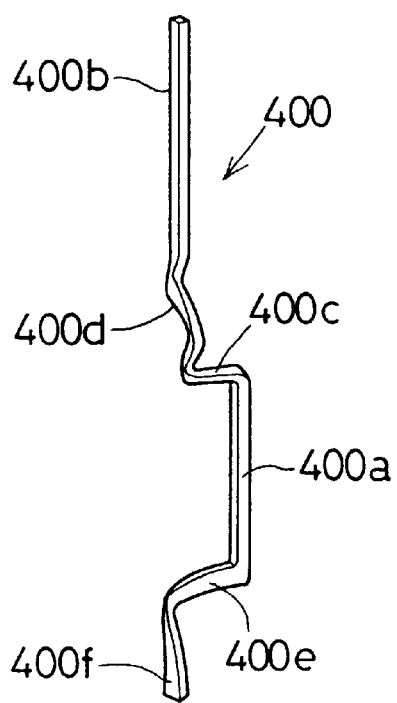
FIG. 29 is a perspective view showing the shape of a single coil bar.

As shown in FIGS. 28 and 29, the armature coil is constructed by a single coil bar 400 for each slot 3*a* and is formed by electrically connecting coil arms of the coil bar 4.

The coil bar 400 comprises a lower layer coil trunk 400*a* inserted to the inner peripheral side of the slot 3*a*, an upper layer coil trunk 400*b* inserted to the outer peripheral side of the slot 3*a* provided with a predetermined interval in the peripheral direction of the armature core 3 from the slot 3*a* to which the lower layer coil trunk 400*a* is inserted, coil arms 400*c*, 400*d*, 400*e* and 400*f* for electrically connecting the lower layer coil trunk 400*a* and the upper layer coil trunk 400*b*.

As shown in FIG. 32, a lower layer coil arm 400*c* and an upper layer coil arm 400*d* are extended along one axial end face of the armature core 3 in the radial direction and inner peripheral ends of which are connected to each other. The outer peripheral end of the lower layer coil arm 400*c* is connected to one end of the lower layer coil trunk 400*a* and the outer peripheral end of the upper layer coil arm 400*d* is connected to one end of the upper layer coil trunk 400*b*.

A lower layer coil arm 400*e* and an upper layer coil arm 400*f* are extended along other axial end face of the armature core 3 in the radial direction and inner peripheral ends of the same are connected to each other. The outer peripheral end of the lower layer coil arm 400*e* is connected to the other end of the lower layer coil trunk 400*a* and the outer peripheral end of the upper layer coil arm 400*f* is connected to the other end of the other upper layer coil trunk 400*b*.

As shown in FIG. 29, in respect of the coil bar 400 before integrating to the armature core 3, both of the lower layer coil arms 400*c* and 400*e* are shaped into a form that is bent substantially orthogonally to the lower layer coil trunk 400*a*. However, the lower layer coil arm 400*c* on one side and the lower layer coil arm 400*e* on the other side are twisted by a predetermined angle to sides opposed to each other in the peripheral direction centering on the lower layer coil trunk 400*a*. Further, the upper layer coil arm 400*f* on the other side is provided as a commutator face where a brush (not illustrated) is brought into contact with the outer peripheral face.

A step of integrating the coil bar 400 to the armature core 3 is performed as follows.

Figure 30:
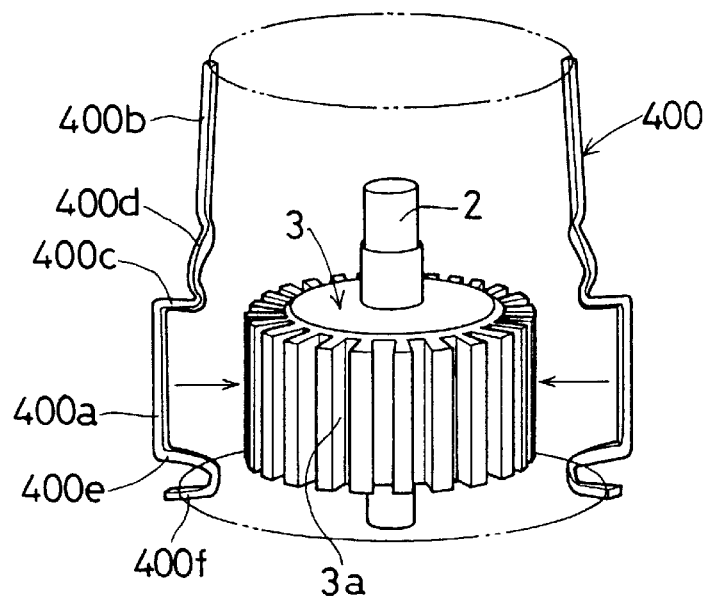
FIG. 30 is a perspective view showing a step of integrating the coil bar to an armature core.
Figure 31:
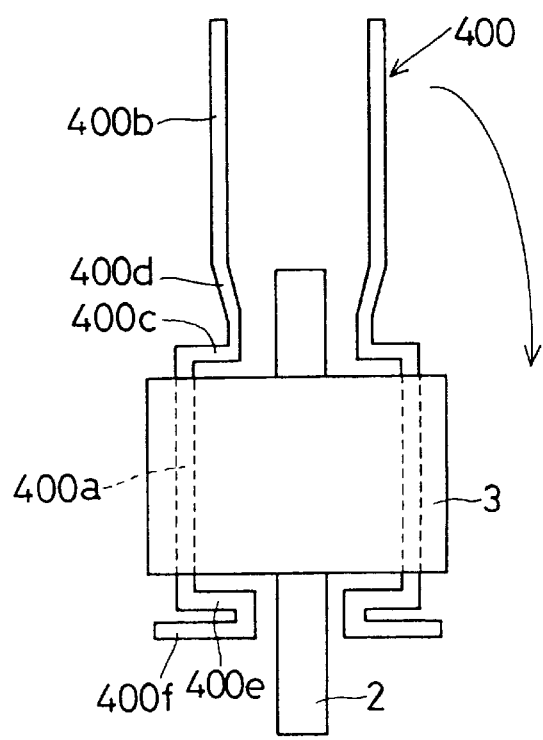
FIG. 31 is a side view showing the step of integrating the coil bar to the armature core.

First, as shown in FIG. 30, a predetermined number of the coil bars 400 are arranged at the outer periphery of the armature core 3 in the radial direction and the lower layer coil trunk 400*a* of each of the coil bar 400 is respectively inserted into the slot 3*a* as shown in FIG. 31. At this occasion, the upper layer coil arm 400*f* on the other side connected to the lower layer coil arm 400*e* on the other side may be bent previously in a predetermined shape before inserting the lower layer coil trunk 400*a* into the slot 3*a* or may be bent in the predetermined shape after inserting the lower layer coil trunk 400*a* into the slot 3*a*. Further, "predetermined shape" referred here signifies a state where the upper coil arm 400*f* is bent from a shape shown in FIG. 29 to be substantially in parallel with the lower layer coil arm 400*e* and twisted by a predetermined angle in respect of the lower layer coil arm 400*e* (FIG. 33).

Successively, the upper layer coil arm 400*d* on one side connected to the lower layer coil arm 400*c* on one side, is bent to the outer side in the radial direction of the armature core 3 in a state of being twisted by a predetermined angle in respect of the lower layer coil arm 400*c* and thereafter, the upper layer coil trunk 400*b* is bent to the side of the armature core 3 in respect of the upper layer coil arm 400*d* and is inserted into an appropriate slot 3*a* which is different from the slot 3*a* to which the lower layer coil trunk 400*a* is inserted. This is for the reason that a plurality of the coil bars 400 provides an armature winding wound on the core 3.

Successively, the end portion of the upper layer coil trunk 400b is brought into contact with the outer peripheral end of the upper layer coil arm 400f on the other side of the other coil bar 400 and a contact face X (FIG. 28) of both is electrically bonded by welding or the like. In this way, the respective coil bars 400 are electrically connected and the armature coil is formed.

According to the embodiment, the lower layer coil trunk 400a and the upper layer coil trunk 400b of a single piece of the coil bar 400 have integrally been formed previously via the first coil arm (lower layer coil arm 400c and upper layer coil arm 400d) and therefore, the respective ends of the lower layer coil trunk 400a and the upper layer coil trunk 400b need not connect to the lower layer coil arm 400c and the upper layer coil arm 400d. As a result, portions of bonding of the respective coil bar 400 can be reduced and accordingly, the bonding cost can be restrained at a low value.

Further, after inserting the lower layer coil trunk 400a to the slot 3a, it is possible to bend the upper layer coil arm 400d on one side connected to the lower layer coil arm 400c on one side and to bend the upper layer coil trunk 400b to the side of the armature core 3 in respect of the upper layer coil arm 400d and insert the upper layer coil trunk 400b into the predetermined slot 3a and therefore, compared with the case where a finished coil which has been previously formed in a shape after inserting the slot, is integrated to the armature core 3, the integration to the armature 3 is facilitated and the possibility of impairing the coil bar 400 in inserting the upper layer coil trunk 400b to the slot 3a is reduced.

The respective coil bars 400 are connected by bonding the end portion of the upper layer coil trunk 400b of one of the coil bar 400 with the outer peripheral end of the upper layer coil arm 400f of the other one of the coil bar 400. That is, the portion of bonding the respective coil bar 400 can be provided on the outer peripheral side in the radial direction of the armature core 3 and therefore, the interval between contiguous portions of bonding can be increased and the sectional area of coil of the portion of bonding can also be increased.

Further, the upper layer coil arms 400f of the coil bar 400 may be used as the commutator surface. Thereby, a commutator needs not to be provided newly and therefore, the total length of the rotor 1 can be shortened by that amount and the cost can be reduced.

Further, in respect of insulating treatment for insulating the coil bar 400 from the armature core 3, as shown in FIG. 33, in integrating the coil bar 400 to the armature core 3, insulators 4 and 5 may respectively be interposed between the inner wall face of the slot 3a and the lower layer coil trunk 400a and between the lower layer coil trunk 400a and the upper layer coil trunk 400b. Further as shown in FIG. 34, insulators 6 and 7 may respectively be interposed between an axial end face of the armature core 3 and the lower layer coil arms 400c and 400e and between the lower layer coil arms 400c and 400e and the upper layer coil arms 400d and 400f. Alternatively, the insulating treatment may be performed by winding insulating paper, insulating tape or the like around the coil bar 400 or coating an insulator thereon or the like.

Figure 35:
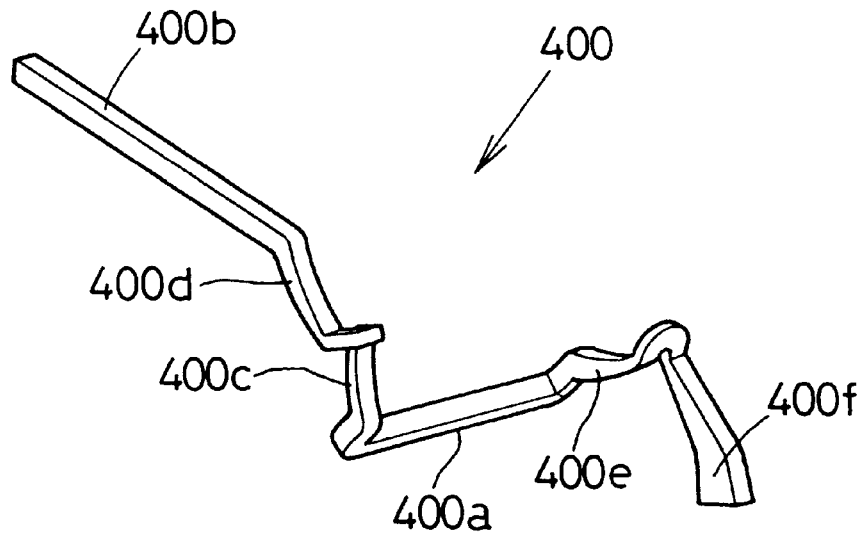
FIG. 35 is a perspective view showing the shape of a coil bar in a modified form.
Figure 36:
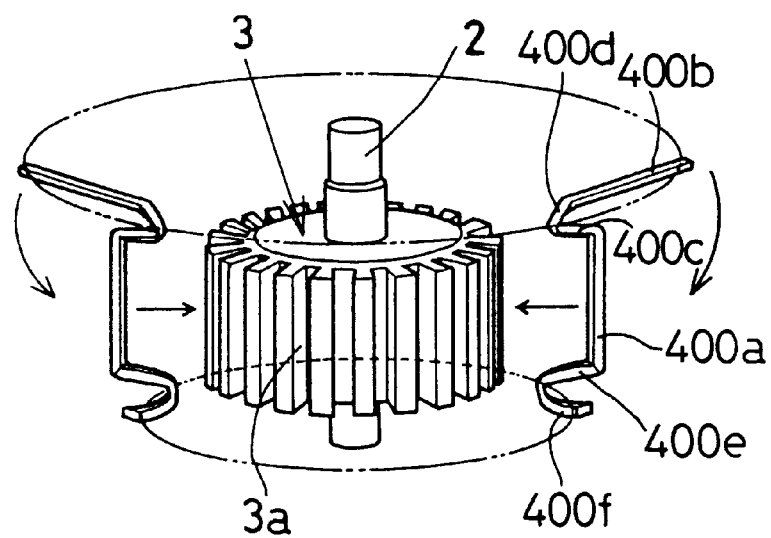
FIG. 36 is a perspective view showing a step of integrating the coil bar to the armature core.

Further, although according to the embodiment, after inserting the lower layer coil trunk 400a to the slot 3a, the upper layer coil arm 400d is bent to the outer side in the radial direction of the armature core 3 in a state where the upper layer coil arm 400d on one side is twisted by a predetermined angle in respect of the lower layer coil arm 400c, as shown in FIG. 35, the upper layer coil arm 400d may be bent previously in a state where the upper layer coil arm 400d is twisted by a predetermined angle in respect of the lower layer coil arm 400c before integrating to the armature core 3. In this case, as shown in FIG. 36, a number of steps of bending after inserting the lower layer coil trunk 400a into the slot 3a can be reduced. That is, only the upper layer coil trunk 400b may be bent to the side of the armature core 3 and may be inserted into the predetermined slot 3a.

EMBODIMENT 7

Figure 37:
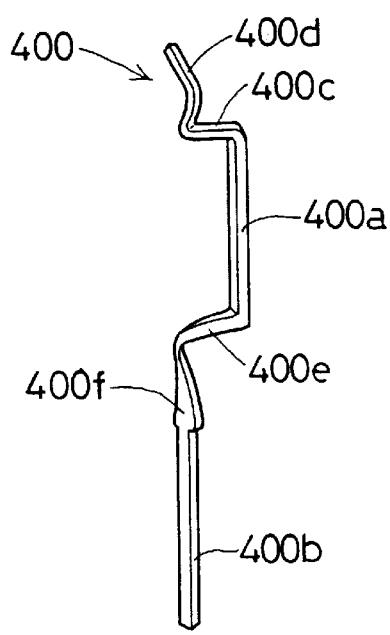
FIG. 37 is a perspective view showing the shape of a coil bar (Embodiment 7)
Figure 38:
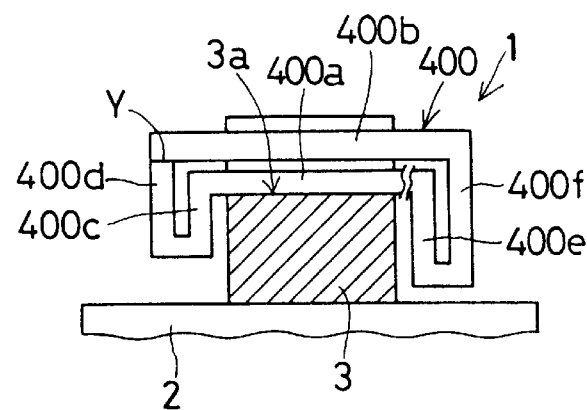
FIG. 38 is a half-cut sectional view of a rotor.

In this embodiment shown in FIGS. 37 and 38, the upper layer coil trunk 400b is connected to the upper layer coil arm 400f on the other side forming the commutator surface. Therefore, the end portion of the upper layer coil trunk 400b is brought into contact with the outer peripheral end of the upper layer coil arm 400d on one side of the other coil bar 400 and a contact face Y between both is bonded. Therefore, according to the embodiment, the first coil arm is formed by the lower layer coil arm 400e and the upper layer coil arm 400f and the second coil arm is formed by the lower layer coil arm 400c and the upper layer coil arm 400d.

EMBODIMENT 8

Figure 39:
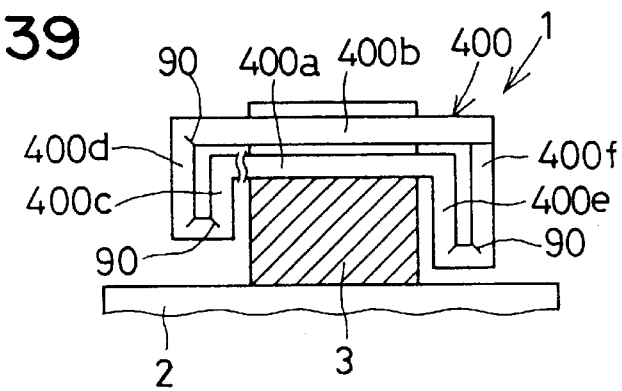
FIG. 39 is a half-cut sectional view of a rotor (Embodiment 8)
Figure 40:
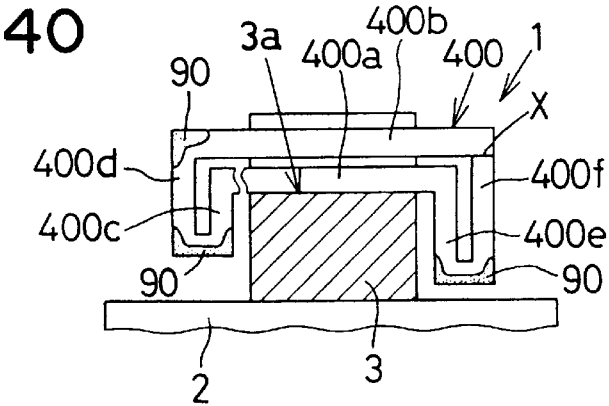
FIG. 40 is a half-cut sectional view of a rotor.

According to the embodiment, as shown in FIGS. 39 and 40, a sectional area reducing portion 90 is provided to each bending portion to facilitate bending of the coil bar 400 in a predetermined shape. The sectional area reducing portion 90 may be provided at any of the bending portions. For example, the sectional area reducing portion 90 is provided on the inner side of each bending portion (FIG. 39) or the sectional area reducing portion 90 is provided on the outer side of each bending portion (FIG. 40).

In this case, load required for shaping a coil (that is, load in bending a coil) can be reduced and therefore, the facility cost can be reduced. Further, by providing the sectional area reducing portion 90 at each bending portion, the direction of bending the coil bar 400 can be prescribed and therefore, the coil can be shaped further conveniently.

EMBODIMENT 10

Figure 41:
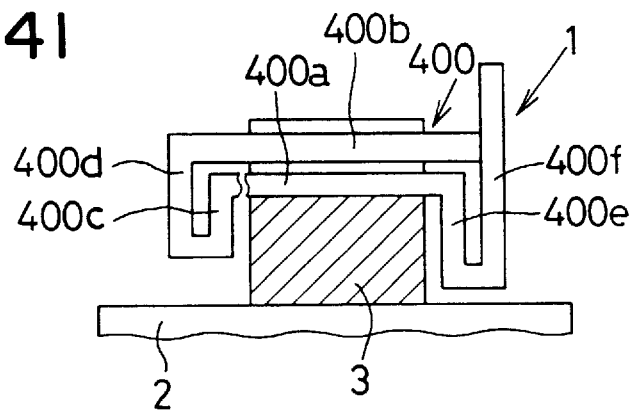
FIG. 41 is a half-cut sectional view of a rotor (Embodiment 10)

As shown in FIG. 41, the upper layer coil arm 400f which is used as a commutator surface is prolonged more than the outer diameter of the armature core 3. In this case, the face of commutator larger than a sectional area of the armature core 3 in the radial direction can be formed and therefore, an area of a brush for supplying electric current can be increased and wear life of the brush can significantly be improved.

MODIFICATIONS

Figure 42:
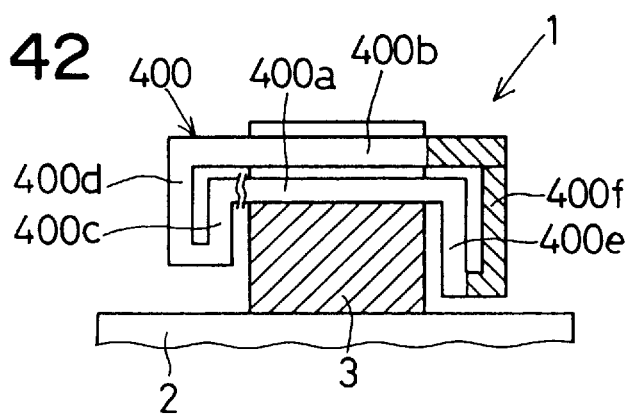
FIG. 42 is a half-cut sectional view of a rotor (Modified Embodiment)
Figure 43:
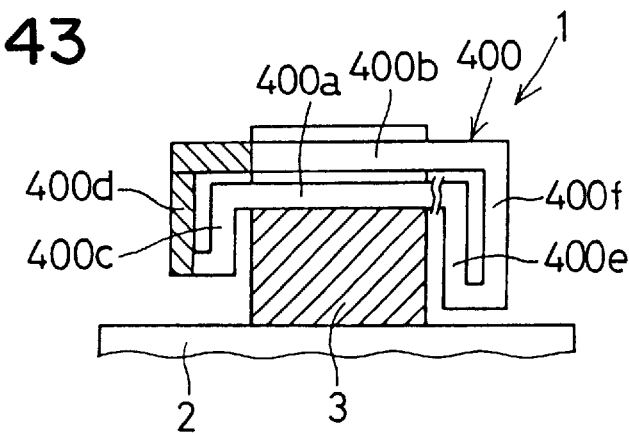
FIG. 43 is a half-cut sectional view of a rotor (Modified Embodiment)

The location of bonding the coil bar 400 needs not to be that of the end portion of the upper layer coil trunk 400b and the outer peripheral end of the upper layer coil arm 400d or 400f but any location of the coil bar 400 may be bonded so far as the bonding operation can be performed. That is, the shape of the coil bar 400 is not limited to that shown in FIG. 28 and FIG. 38 but any location of the coil bar 400 may be cut so far as the first coil arm (the lower layer coil arm 400c and the upper layer coil arm 400d in the sixth embodiment, the lower layer coil arm 400e and the upper layer coil arm 400f in the seventh embodiment), the lower layer coil trunk 400a, the second coil arm (the lower layer coil arm 400e and the upper layer coil arm 400f in the sixth embodiment, the lower layer coil arm 400c and the upper layer coil arm 400d in the seventh embodiment) and the upper layer coil trunk 400b are integrally provided. In view of easiness in bonding operation, anywhere in hatched regions shown in FIG. 42 and FIG. 43. The upper layer coil trunk 400b and the upper layer coil arm 400d or 400f projected to the outer side of the slot 3a may preferably be provided.

Figure 44:
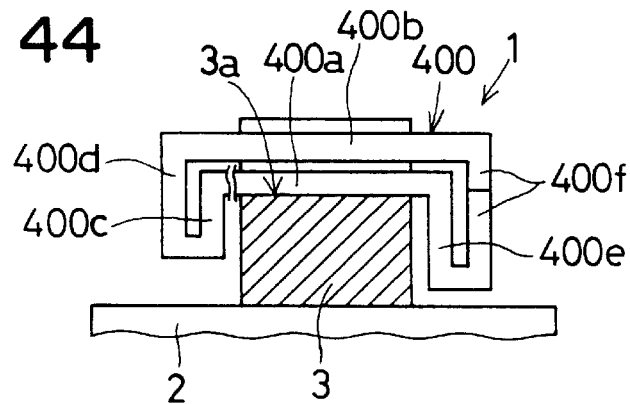
FIG. 44 is a half-cut sectional view of a rotor (Modified Embodiment)
Figure 45:
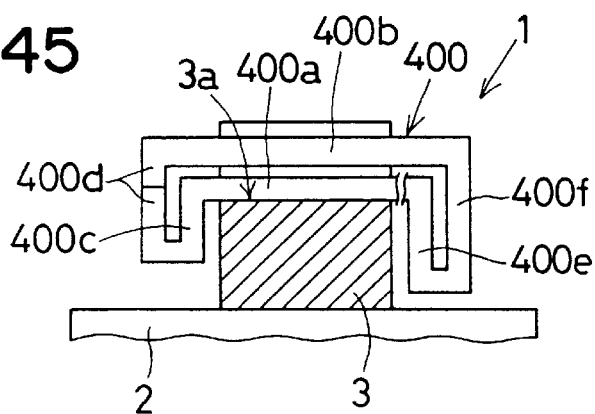
FIG. 45 is a half-cut sectional view of a rotor (Modified Embodiment)
Figure 46:
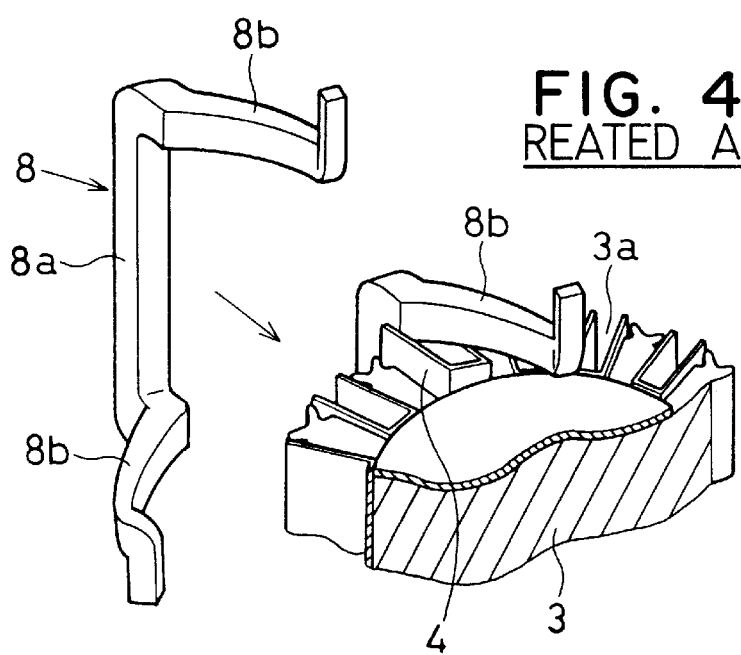
FIG. 46 is a sectional view showing a state of inserting a lower layer coil trunk into a slot in a related art.

According to another modification shown in FIGS. 44 and 45, the bonding portions are provided at the midways of the second coil arms (the upper layer coil arm 400f in FIG. 44, the upper layer coil arm 400d in FIG. 45). Therefore, a portion of the second coil arm may integrally be formed with the upper layer coil trunk 400b.

Although according to the above embodiments, in order to promote the integrating performance of the coil bar 400 in respect of the armature core 3, the coil bar 400 is shaped substantially in a channel-like shape by previously bending the pair of lower layer coil arms 400c and 400e substantially orthogonally to the lower layer coil trunk 400a, the coil bar 400 can be constructed by substantially a rod-like shape by specifying the bending portions, for example, providing the sectional area reducing portions 90 at bending portions.

Further, according to the embodiments, when the coil bar 4 is bent in the predetermined shape, the gaps are formed respectively between the lower layer coil trunk 400a and the upper layer coil trunk 400b, between the lower layer coil arms 400c and 400e and the upper layer coil arms 400d and 400f as shown in, for instance, FIG. 28. Therefore, the insulating treatment can be omitted between the lower layer coil trunk 400a and the upper layer coil trunk 400b, between the lower layer coil arms 400c and 400e and the upper layer coil arms 400d and 400f.

In respect of the lower layer coil trunk 400a and the upper layer coil trunk 400b of the coil bar 400 inserted into the slot 3a, the sectional shape is square or circular in correspondence with the sectional shape of the slot 3a.

The present invention may be modified or changed further without departing from the spirit of the invention.

What is claimed is:

1. A method of producing a rotor comprising the steps of:

providing an armature core having a slot at an outer periphery thereof, a coil bar having a linear coil trunk, and a slot insulator made of a flexible material for insulating the coil trunk from the armature core;

positioning the slot insulator at an attitude inclined by a predetermined angle relative to the coil trunk;

combining the slot insulator and the coil trunk into a set by moving one end portion of the slot insulator into contact with one end portion of the coil trunk, and subsequently moving another end portion of the slot insulator and another end portion of the coil trunk proximal to each other with one of the one end portions acting as a fulcrum and thus changing an attitude of at least one of the slot insulator and the coil trunk such that the slot insulator and the coil trunk become parallel to each other; and inserting the combined set of the slot insulator and the coil trunk into the slot of the armature core from an outer peripheral side in a radial direction of the armature core.

2. A method of producing a rotor comprising the steps of:

providing an armature core having a slot at an outer periphery thereof, a coil bar having a linear coil trunk, and a slot insulator made of a flexible material for insulating the coil trunk from the armature core;

combining the slot insulators and coil trunk into a set; and inserting the combined set of the slot insulator and the coil trunk into the slot of the armature core from an outer peripheral side in a radial direction of the armature core, wherein:

the slot insulator is inclined by a predetermined angle at a predetermined position, the coil bar is moved to a side of the slot insulator from a direction opposed to the slot insulator by which one end portion of the coil trunk is brought into contact with one end portion of the slot insulator, and the coil bar is further moved thereby pushing the slot insulator at a contact portion by which the slot insulator is combined with the coil trunk by changing an attitude of the slot insulator with the contact portion acting as a fulcrum such that the slot insulator becomes parallel with the coil trunk by making another end portion of the coil trunk and another end portion of the slot insulator proximate to each other; and thereafter, the combined set of the slot insulator and the coil trunk are inserted integrally into the slot from the outer peripheral side in the radial direction of the armature core.

3. The method according to claim 1, wherein:

a pair of side face portions extending from respective sides of a bottom face portion of the slot insulator to form a channel-like shape are arranged for receiving side faces of the coil trunk by outwardly opening the pair of side face portions before integrating to the coil trunk such that a width of an opening between the pair of the side face portions is larger than a width of the coil trunk.

4. The method according to claim 1, wherein:

the slot insulator is restricted from moving in a direction of moving the coil bar until the slot insulator is combined with the coil trunk.

5. The method according to claim 3, wherein:

the slot insulator is restricted from moving such that the other end portion is not moved in the direction of moving the coil bar until the slot insulator is combined integrally with the coil trunk.

6. The method according to one of claims 1 to 5, wherein:

the armature core includes a plurality of slots, a slot insulator and a coil trunk are combined for each slot of the armature core, respectively and the combined sets of slot insulators and coil trunks are simultaneously inserted into the slots from the outer peripheral side in the radial direction of the armature core.

7. The method according to claim 6, further comprising the step of:

mounting, after inserting predetermined numbers of the slot insulators and the coil bars in respective slots of the armature core, a ring-like insulator to an outer diameter portion of projected portions provided at end portions of the coil bars and extending in an axial direction by pressing the projected portions from the outer peripheral side to an inner peripheral side in the radial direction by which an outer diameter of the projected portions is regulated to a predetermined dimension smaller than an inner diameter of the ring-like insulator and while in this state, fitting the ring-like insulator to the outer diameter portions of the projected portions.

8. A method of producing a rotor comprising the steps of:

providing an armature core having at least one slot at an outer periphery thereof, a coil bar for each slot, each coil bar having a linear coil trunk, and a slot insulator for each coil trunk made of a flexible material for insulating the coil trunk inserted into the slot from the armature core;

positioning the slot insulator at an attitude inclined by a predetermined angle relative to the coil trunk;

integrating the slot insulator and the coil bar to the armature core by moving one end portion of the slot insulator into contact with one end portion of the coil trunk, and subsequently moving another end portion of the slot insulator and another end portion of the coil trunk proximal to each other with one of the one end portions acting as a fulcrum and thus changing an attitude of at least one of the slot insulator and the coil trunk such that the slot insulator and the coil trunk become parallel to each other;

wherein a pair of side face portions extending from respective sides of a bottom face portion of the slot insulator to form a channel-like shape are arranged for receiving side faces of the coil trunk upon integrating the slot insulator and the coil bar by outwardly opening front end portions of the pair of side face portions such that a width of an opening between the pair of side face portions is larger than a width of the coil trunk.

9. A method of producing a rotor comprising the steps of:

providing an armature core having a plurality of axially extending slots at an outer periphery thereof, a plurality of coil bars each having a coil trunk, and a plurality of slot insulators for insulating the coil trunks from the armature core;

combining the slot insulators and the coil trunks into a plurality of sets; and inserting the combined sets into the slots of the armature core radially inwardly from the outer peripheral side of the armature core, respectively;

wherein the combining step includes the steps of:
  maintaining each slot insulator and coil trunk in each combined set in an inclined relation to each other while maintaining one end portion of the slot insulator in contact with one end portion of the coil trunk; and relatively moving another end portion of the slot insulator and another end portion of the coil trunk closely to each other and using the one end portion of the slot insulator as a fulcrum so that the slot insulator and the coil trunk become parallel to each other to provide the combined set of the slot insulator and the coil trunk.

* * * * *